US011838601B2

(12) United States Patent
Tomita et al.

(10) Patent No.: US 11,838,601 B2
(45) Date of Patent: Dec. 5, 2023

(54) ADVERTISEMENT DISPLAY METHOD, ADVERTISEMENT DISPLAY DEVICE, AND NON-TRANSITORY COMPUTER READABLE MEDIUM STORING ADVERTISEMENT DISPLAY PROGRAM

(71) Applicant: LINE Corporation, Tokyo (JP)

(72) Inventors: Megumi Tomita, Tokyo (JP); Yusuke Konishi, Tokyo (JP)

(73) Assignee: LINE CORPORATION, Tokyo (JP)

( * ) Notice: Subject to any disclaimer, the term of this patent is extended or adjusted under 35 U.S.C. 154(b) by 0 days.

(21) Appl. No.: 17/120,742

(22) Filed: Dec. 14, 2020

(65) Prior Publication Data

US 2021/0099771 A1      Apr. 1, 2021

Related U.S. Application Data

(63) Continuation of application No. PCT/JP2018/044433, filed on Dec. 3, 2018.

(30) Foreign Application Priority Data

Jun. 29, 2018   (JP) .................. 2018-125616

(51) Int. Cl.
*H04N 21/258* (2011.01)
*H04N 21/262* (2011.01)
(Continued)

(52) U.S. Cl.
CPC ....... *H04N 21/812* (2013.01); *H04N 21/4316* (2013.01); *H04N 21/44016* (2013.01); *H04N 21/458* (2013.01); *H04N 21/4532* (2013.01)

(58) Field of Classification Search
CPC ............. H04N 21/812; H04N 21/4316; H04N 21/44016; H04N 21/4532; H04N 21/458
See application file for complete search history.

(56) References Cited

U.S. PATENT DOCUMENTS

2002/0004754 A1   1/2002 Gardenswartz
2004/0071088 A1   4/2004 Curcio et al.
(Continued)

FOREIGN PATENT DOCUMENTS

JP    2002540489 A    11/2002
JP    2003-244677 A    8/2003
(Continued)

OTHER PUBLICATIONS

Written Opinion PCT/ISA/237 for International Application No. PCT/JP2018/044433 dated Jan. 29, 2019 (English translation provided).

(Continued)

*Primary Examiner* — Hsiungfei Peng
(74) *Attorney, Agent, or Firm* — Harness, Dickey & Pierce, P.L.C.

(57) ABSTRACT

An advertisement display method of displaying an advertisement transmitted from a server in a terminal of a user including receiving, from the server, first video data being a part of video data of the advertisement, controlling to activate the application in response to selection of the application by the user, displaying a first display based on the first video data in a display region of the terminal while the application is active, receiving, from the server, second video data being different from the first video data included in the video data of the advertisement, based on reception of the first video data, and displaying a second display based on the second video data in the display region, in association with the first display in the display region may be provided.

25 Claims, 10 Drawing Sheets

(51) Int. Cl.

| | |
|---|---|
| *H04N 21/2662* | (2011.01) |
| *H04N 21/433* | (2011.01) |
| *H04N 21/462* | (2011.01) |
| *H04N 21/81* | (2011.01) |
| *H04N 21/845* | (2011.01) |
| *H04M 1/00* | (2006.01) |
| *G06F 13/00* | (2006.01) |
| *G06Q 30/02* | (2023.01) |
| *H04N 21/431* | (2011.01) |
| *H04N 21/44* | (2011.01) |
| *H04N 21/45* | (2011.01) |
| *H04N 21/458* | (2011.01) |

(56) References Cited

U.S. PATENT DOCUMENTS

| | | | |
|---|---|---|---|
| 2004/0174853 A1 | 9/2004 | Saito et al. | |
| 2010/0254684 A1 | 10/2010 | Saitoh et al. | |
| 2010/0332586 A1* | 12/2010 | Jogand-Coulomb | H04L 67/5681 |
| | | | 711/E12.001 |
| 2014/0368734 A1* | 12/2014 | Hoffert | H04L 65/60 |
| | | | 348/564 |
| 2016/0219332 A1* | 7/2016 | Asbun | H04N 21/4532 |
| 2016/0277777 A1* | 9/2016 | Kimura | H04N 21/812 |
| 2017/0083935 A1* | 3/2017 | Maughan | G06Q 30/0244 |
| 2018/0097864 A1* | 4/2018 | Brinkley | H04L 65/1089 |
| 2019/0207865 A1* | 7/2019 | Fukuda | H04N 21/2402 |
| 2019/0327425 A1* | 10/2019 | Kobayashi | H04N 21/6125 |

FOREIGN PATENT DOCUMENTS

| | | | |
|---|---|---|---|
| JP | 2004-272563 | A | 9/2004 |
| JP | 2005266944 | A | 9/2005 |
| JP | 2006503463 | A | 1/2006 |
| JP | 2006050220 | A | 2/2006 |
| JP | 2008242559 | A | 10/2008 |
| JP | 201055193 | A | 3/2010 |
| JP | 2016177607 | A | 10/2016 |
| JP | 2016184774 | A | 10/2016 |
| JP | 2017041774 | A | 2/2017 |
| KR | 10-2005-0065592 | A | 6/2005 |
| WO | WO-2010/041576 | A1 | 4/2010 |

OTHER PUBLICATIONS

International Search Report PCT/ISA/210 For International Application No. PCT/JP2018/044433 dated Jan. 29, 2019.

Written Opinion PCT/ISA/237 for International Application No. PCT/JP2018/044433 dated Jan. 29, 2019.

Japanese Office Action dated Aug. 4, 2020 issued in corresponding Japanese Patent Application No. 2018-125616.

Japanese Office Action dated Apr. 19, 2022 issued in corresponding Japanese application No. 2021-068263. English translation has been provided.

Korean Office Action dated Apr. 11, 2022 issued in corresponding Korean Patent Application No. 10-2020-7036297.

\* cited by examiner

FIG. 2

| ADVERTISEMENT ID ~201 | DISPLAY REGION ID ~202 | DOWNLOAD STATE ~203 | DISPLAY PROBABILITY ~204 | PRIORITY ~205 |
|---|---|---|---|---|
| ... | ... | ... | ... | ... |
| C000121 | D0023 | 50% | 80% | HIGH |
| C000122 | D0038 | 100% | 0 | LOW |
| C000123 | — | 0% | 10% | MIDDLE |
| ... | ... | ... | ... | ... |

200

ADVERTISEMENT DISPLAY METHOD, ADVERTISEMENT DISPLAY DEVICE, AND NON-TRANSITORY COMPUTER READABLE MEDIUM STORING ADVERTISEMENT DISPLAY PROGRAM

CROSS-REFERENCE TO RELATED APPLICATIONS

This U.S. non-provisional application is a continuation of and claims the benefit of priority under 35 U.S.C. § 365(c) to International Application PCT/JP2018/044433, which has an International filing date of Dec. 3, 2018 and claims priority to Japanese Patent Application No. 2018-125616, filed Jun. 29, 2018, the entire contents of each of which are incorporated herein by reference in their entirety.

BACKGROUND

Field

The present disclosure relates to display methods of an advertisement in a terminal.

Description of Related Art

In recent years, there have been services of distributing advertisements via a network. In some conventional distribution systems for distributing advertisements via a network, arbitrary commercials associated with contents can be distributed even when connection between a server and a receiver terminal is interrupted. However, the terminal may fail to appropriately receive information of the advertisements in some cases.

SUMMARY

According to an example embodiment, an advertisement display method of displaying an advertisement transmitted from a server in a terminal of a user includes receiving, from the server, first video data being a part of video data of the advertisement, controlling, by a processor of the terminal, to activate the application in response to selection of the application by the user, displaying a first display based on the first video data in a display region of the terminal while the application is active, receiving, from the server, second video data which is different from the first video data included in the video data of the advertisement, based on reception of the first video data, and displaying a second display based on the second video data in the display region, in association with the first display in the display region.

According to an example embodiment, a terminal of a user that displays an advertisement transmitted from a server includes a memory configured to a program, and one or more processors configured to execute the program such that the one or more processors are configured to cause the terminal of the user to receive, from the server, first video data being a part of video data of the advertisement, control to activate the application in response to selection of the application by the user, display a first display associated with the first video data in a display region of the terminal while the application is active, receive, from the server, second video data being different from the first video data included in the video data of the advertisement, based on reception of the first video data, and display a second display associated with the second video data in the display region, based on the first display in the display region.

An example embodiment provides a non-transitory computer readable medium storing an advertisement display program that, when executed by a processor, causes a terminal of a user including the processor to perform an advertisement display method of displaying an advertisement transmitted from a server. The method includes receive, from the server, first video data being a part of video data of the advertisement, control to activate the application in response to selection of the application by the user, display a first display based on the first video data in a display region of the terminal while the application is active, receive, from the server, second video data being different from the first video data included in the video data of the advertisement, based on reception of the first video data, and display a second display based on the second video data in the display region, in association with the first display in the display region.

According to an example embodiment, an advertisement display method of displaying an advertisement transmitted from a server in a terminal of a user includes receiving, from the server, first video data being a part of video data of the advertisement, providing a first display associated with the first video data in a display region of the terminal, receiving, from the server, second video data being different from the first video data out of the video data of the advertisement, based on reception of the first video data, and providing a second display associated with the second video data in the display region, based on the first display in the display region.

BRIEF DESCRIPTION OF THE DRAWINGS

FIG. 2 is a conceptual diagram of data illustrating a configuration example of download state information.

DETAILED DESCRIPTION

Compliance with Legal Requirements

It should be noted that the disclosure described herein presupposes compliance with legal requirements of countries in which the disclosure is to be implemented, which are necessary for implementation of the present disclosure, such as secrecy of communication.

Some example embodiments for carrying out an information transmission method according to the present disclosure will be described with reference to the drawings.

System Configuration

Figure 1:
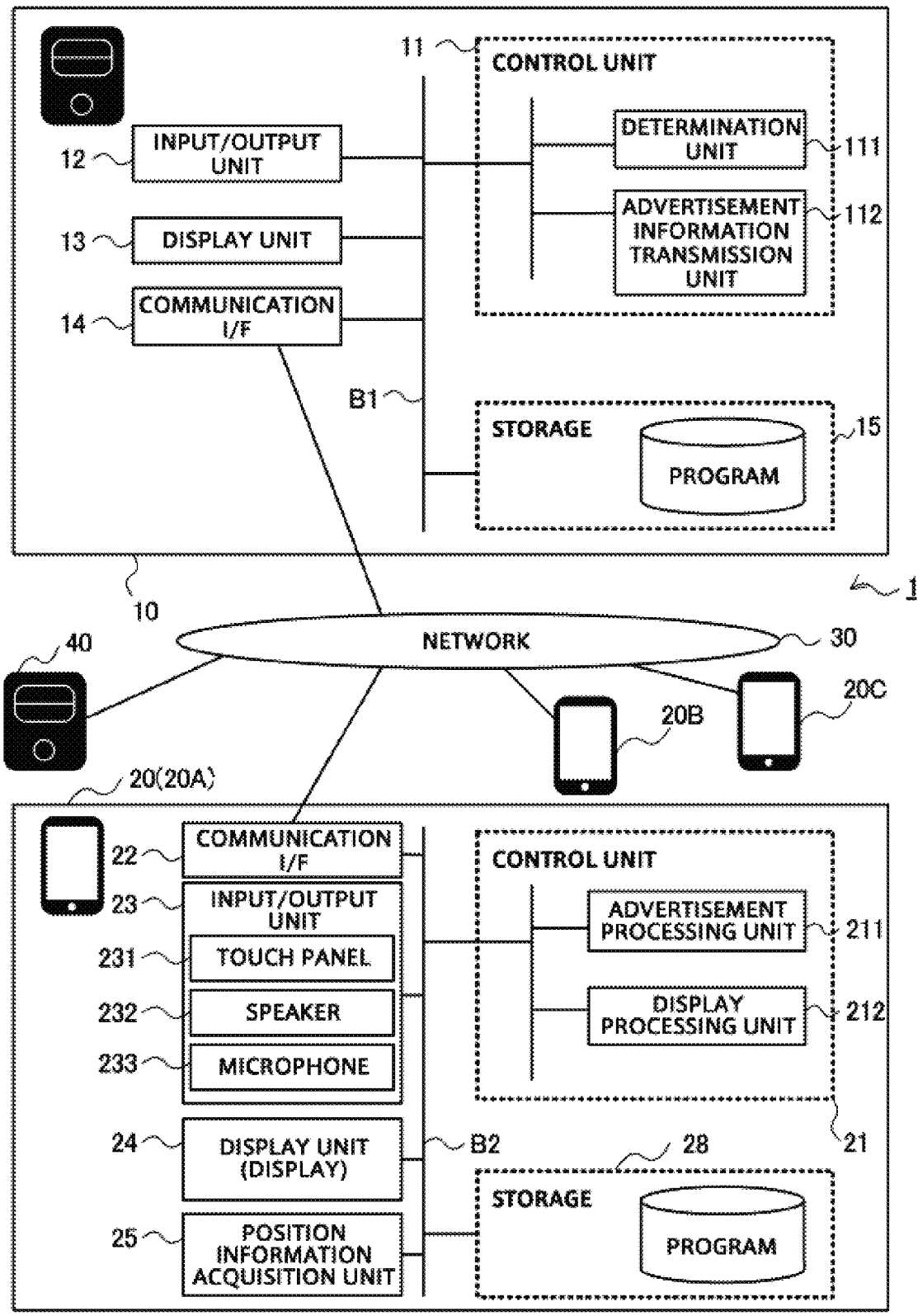
FIG. 1 is a diagram illustrating a configuration of a communication system according to one aspect of an example embodiment.

FIG. 1 illustrates a configuration of a communication system 1 according to one example embodiment of the present disclosure. As disclosed in FIG. 1, in the communication system 1, a management server 10 and terminals 20 (a terminal 20A, a terminal 20B, and a terminal 20C) are connected via a network 30. In other words, in the communication system 1, an advertisement server 40 and the terminals 20 are connected via the network 30. The management server 10 notifies the terminal 20 of a location (a stored location, for example, an address) of an advertisement, in accordance with a request from the terminal 20. The advertisement server 40 stores real data of various advertisements, and distributes a specified advertisement in accordance with a request from the terminal 20.

The network 30 serves to connect one or more terminals and one or more management servers 10. For example, the network 30 may refer to a communication network that provides a connection path to enable the terminal 20 to transmit and receive data after the terminal 20 connects to the management server 10.

One or a plurality of parts of the network 30 may be a wired network or a wireless network. For example, without limitation, the network 30 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a part of the Internet, a part of the public switched telephone network (PSTN), a mobile phone network, integrated service digital networks (ISDN), a wireless LAN, long term evolution (LTE), code division multiple access (CDMA), Bluetooth (registered trademark), satellite communication, and the like, or a combination of two or more of these. The network 30 may include one or a plurality of networks 30.

The terminal 20 (the terminal 20A, the terminal 20B, and the terminal 20C) may be any type of terminal as long as the terminal is an information processing terminal that is capable of implementing functions to be described in the following example embodiments. For example, without limitation, the terminal 20 includes a smartphone, a mobile phone (e.g., feature phone), a computer (e.g., without limitation, a desktop, a laptop, or a tablet), a media computer platform (e.g., without limitation, a cable, a satellite set top box, or a digital video recorder), a hand-held computer device (e.g., without limitation, a personal digital assistant (PDA), or an electronic mail client), a wearable terminal (e.g., an eyeglass-type device, or a watch-type device), or another type of computer, or a communication platform. The terminal 20 may be referred to as an information processing terminal. The terminal 20 functions as an advertisement display device that displays various advertisements.

The configurations of the terminal 20A, the terminal 20B, and the terminal 20C are the same or substantially similar to each other, and thus the terminal 20 will be described in the following description. As needed, a terminal used by a user X is referred to as a terminal 20X, and user information in a desired (or alternatively, predetermined) service that is associated with the user X or the terminal 20X is referred to as user information X. Note that the user information refers to information of a user that is associated with an account used by the user in a desired (or alternatively, predetermined) service. For example, without limitation, the user information may include information that is associated with a user, such as the name of the user, the icon image of the user, the age of the user, the gender of the user, the address of the user, preferences of the user, and/or the identifier of the user, which are input by the user or are provided by a desired (or alternatively, predetermined) service.

The management server 10 includes a function of providing a desired (or alternatively, predetermined) service for the terminal 20. The management server 10 may be any type of device as long as the device is an information processing device that is capable of implementing functions to be described in the following example embodiments. For example, without limitation, the management server 10 includes a server device, a computer (e.g., without limitation, a desktop, a laptop, or a tablet), a media computer platform (e.g., without limitation, a cable, a satellite set top box, or a digital video recorder), a hand-held computer device (e.g., without limitation, a PDA or an electronic mail client, or another type of computer, or a communication platform. The management server 10 and the advertisement server 40 each may be referred to as an information processing device. If the management server 10 and the advertisement server 40 need not be distinguished from each other, the management server 10 and the advertisement server 40 may be collectively referred to as an information processing device.

Hardware (HW) Configuration

With reference to FIG. 1, a HW configuration of each device included in the communication system 1 will be described.

(1) HW Configuration of Terminal

The terminal 20 includes a control unit 21 (central processing unit (CPU)), a storage 28, a communication interface (I/F) 22, an input/output unit 23, a display unit 24, and a position information acquisition unit 25. For example, without limitation, the constituent elements of the HW of the terminal 20 may be connected to each other via a bus B2. Note that it is not necessary to include all of the constituent elements as the HW configuration of the terminal 20. For example, without limitation, the terminal 20 may have a configuration that does not include some of the individual constituent elements such as the position information acquisition unit 25.

The communication I/F 22 performs transmission and reception of various pieces of data via the network 30. The communication may be executed in either a wired or wireless manner, and any type of communication protocol may be used as long as the communication protocol allows for execution of intercommunication. The communication I/F 22 has a function of executing communication with the management server 10 via the network 30. The communication I/F 22 transmits various pieces of data to the management server 10 in accordance with a command from the control unit 21. The communication I/F 22 receives various pieces of data transmitted from the management server 10, and transfers such various pieces of data to the control unit 21. The communication I/F 22 may be simply referred to as a communication unit. When the communication I/F 22 is configured with a physically structured circuit, the communication I/F 22 may be referred to as a communication circuit.

The input/output unit 23 includes a device (input unit) that inputs various operations for the terminal 20 and a device (output unit) that outputs processing results obtained through a process in the terminal 20. Regarding the input/output unit 23, the input unit and the output unit may be formed integrally, or the input unit and the output unit may be separated from each other.

The input unit is implemented with any one or a combination of some of the types of devices that can receive input from a user and transfer information relating to the input to the control unit 21. For example, without limitation, the input unit includes a touch panel 231, a touch display, a hardware key such as a keyboard, a pointing device such as a mouse, a camera (operation input through a moving image), and a microphone 233 (operation input by voice).

The output unit is implemented with any one or a combination of some of the types of devices that can output processing results obtained through a process in the control unit 21. For example, without limitation, the output unit includes a touch panel, a touch display, a speaker 232 (voice output), a lens (e.g., without limitation, three-dimensional (3D) output or hologram output), or a printer.

The display unit 24 is implemented with any one or a combination of some of the types of devices that can display in accordance with display data written in a frame buffer. For example, without limitation, the display unit 24 includes a touch panel, a touch display, a monitor (e.g., without limitation, a liquid crystal display or an organic electroluminescence display (OELD)), a head mounted display (HDM), projection mapping, a hologram, and a device that can display image or text information or the like in the air (which may be a vacuum). Note that the display unit 24 as described above may be capable of displaying display data in 3D.

When the input/output unit 23 is a touch panel, the input/output unit 23 and the display unit 24 may be disposed to face each other in substantially the same size and shape.

The position information acquisition unit 25 has a function of acquiring the current position of the terminal 20. For example, without limitation, the position information acquisition unit 25 is implemented with the global positioning system (GPS), the global navigation satellite system (GNSS), or the like. The position information acquisition unit 25 measures the latitude and the longitude of the terminal 20 as the position information of the current position of the terminal 20. Note that the measurement of the position information of the terminal 20 performed by the position information acquisition unit 25 is not limited to using of the GPS, and any method may be used. For example, without limitation, the position information acquisition unit 25 may measure the position information of the terminal 20 by using a wireless LAN such as Wi-Fi. In addition to the above, for example, without limitation, the position information acquisition unit 25 may measure the position information of the terminal 20 by using a communication scheme such as the indoor messaging system (IMES), radio frequency identifier (RFID), or Bluetooth low energy (BLE). For example, without limitation, the position information acquisition unit 25 may measure the position information of the terminal 20 by using a mobile communication system such as Long-Term Evolution (LTE) or Code-Division Multiple Access (CDMA). The position information acquisition unit 25 measures the position information of the terminal 20 in accordance with a request from the control unit 21, and transfers the measured position information to the control unit 21.

The control unit 21 includes a physically structured circuit in order to execute functions that are implemented by codes or instructions included in a program, and is implemented with, for example, without limitation, a data processing device embedded into hardware. Hence, the control unit 21 may be referred to as a control circuit.

For example, without limitation, the control unit 21 includes a central processing unit (CPU), a microprocessor, a processor core, a multiprocessor, an application-specific integrated circuit (ASIC), or a field programmable gate array (FPGA).

The storage 28 has a function of storing various programs and various pieces of data that are required by the terminal 20 for its operation. For example, without limitation, the storage 28 includes various storage media such as a hard disk drive (HDD), a solid state drive (SSD), a flash memory, a random access memory (RAM), or a read only memory (ROM). The storage 28 may be referred to as a memory.

With the terminal 20 storing a program P in the storage 28 and executing the program P, the control unit 21 executes processing using, for example, functional units 211 and 212 included in the control unit 21. In other words, the program P stored in the storage 28 causes the terminal 20 to implement each of the functions executed by the control unit 21. Note that the program P may be implemented as a program module.

The microphone 233 is used for input of voice data. The speaker 232 is used for output of voice data. The camera is used for acquisition of moving image data.

(2) HW Configuration of Server

The management server 10 includes a control unit 11 (CPU), a storage 15, a communication I/F 14, an input/output unit 12, and a display unit 13. For example, without limitation, the constituent elements of the HW of the management server 10 are connected to each other via a bus B1. Note that, regarding the HW of the management server 10, it is not necessary to include all of the constituent elements as the HW configuration of the management server 10. For example, without limitation, the HW of the management server 10 may be a configuration that does not include the display unit 13 (a display).

The control unit 11 includes a physically structured circuit in order to execute functions that are implemented by codes or instructions included in a program, and that are implemented with, for example, without limitation, a data processing device embedded in hardware.

The control unit 11 may be a central processing unit (CPU), or in some example embodiments, the control unit 11 may be a microprocessor, a processor core, a multiprocessor, an ASIC, or an FPGA. Note that, in the present disclosure, the control unit 11 is not limited to these.

The storage 15 has a function of storing various programs and various pieces of data that are desired by the management server 10 for its operation. The storage 15 is implemented with various storage media such as an HDD, an SSD, or a flash memory. Note that, in the present disclosure, the storage 15 is not limited to these. The storage 15 may be referred to as a memory.

The communication I/F 14 performs transmission and reception of various pieces of data via the network 30. The communication may be executed in either a wired or wireless manner, and any type of communication protocol may be used as long as the communication protocol allows for execution of intercommunication. The communication I/F 14 has a function of executing communication with the terminal 20 via the network 30. The communication I/F 14 transmits various pieces of data to the terminal 20 in accordance with a command from the control unit 11. The communication I/F 14 receives various pieces of data transmitted from the terminal 20, and transfers such various pieces of data to the control unit 11. The communication I/F 14 may be simply referred to as a communication unit. When the communication I/F 14 is configured with a physically structured circuit, the communication I/F 14 may be referred to as a communication circuit.

The input/output unit 12 is implemented with a device that inputs various operations for the management server 10. The input/output unit 12 is implemented with any one or a combination of some of the types of devices that can receive input from a user and transfer information relating to the input to the control unit 11. The input/output unit 12 may be implemented with a hardware key typified by a keyboard or the like or a pointing device such as a mouse. Note that, for example, without limitation, the input/output unit 12 may include a touch panel, a camera (to input using a moving image), and a microphone (to input by voice). Note that, in the present disclosure, the input/output unit 12 is not limited to these.

The display unit 13 may be implemented with a monitor (e.g., without limitation, a liquid crystal display or an organic electroluminescence display (OELD)). Note that the display unit 13 may be a head mounted display (HDM) or the like. Note that the display unit 13 as described above may be capable of displaying display data in 3D. Note that, in the present disclosure, the display unit 13 is not limited to these.

With the management server 10 storing a program P in the storage 15 and executing the program P, the control unit 11 executes processing using functional units 111 and 112 included in the control unit 11. In other words, the program P stored in the storage 15 causes the management server 10 to implement each of the functions executed by the control unit 11.

Description of some example embodiments of the present disclosure will be given on the assumption that implementation is achieved by the CPU of the terminal 20 and/or the management server 10 executing the program P.

Note that the control unit 21 of the terminal 20 and/or the control unit 11 of the management server 10 may implement each processing (or one or more portions of the processing) by using not only the CPU but also a logic circuit (hardware) and a dedicated circuit that are formed in an integrated circuit (an integrated circuit (IC) chip or large scale integration (LSI)) or the like. These circuits may be implemented with one or a plurality of integrated circuits, and a plurality of processing operations according to some example embodiments may be implemented with one integrated circuit. LSI may be referred to as VLSI, super LSI, ultra LSI, or the like depending on the degree of integration. Hence, the control unit 21 may be referred to as a control circuit.

The program P (software program/computer program) of each example embodiment of the present disclosure may be provided in a state of being stored in a computer-readable storage medium. The storage medium is capable of storing a program in a "non-transitory tangible medium".

In an appropriate case, the storage medium may include one or a plurality of semiconductor-based or other integrated circuits (ICs) (for example, without limitation, a field programmable gate array (FPGA), an application specific IC (ASIC), or the like), a hard disk drive (HDD), a hybrid hard drive (HHD), an optical disc, an optical disc drive (ODD), a magneto-optical disk, a photomagnetic drive, a floppy diskette, a floppy disk drive (FDD), a magnetic tape, a solid state drive (SSD), a RAM drive, a secure digital card or drive, any other appropriate storage media, or an appropriate combination of two or more of these. The storage medium may be, in an appropriate case, a volatile storage medium, a non-volatile storage medium, or a combination of a volatile storage medium and a non-volatile storage medium. Note that the storage medium is not limited to these examples, and may be any type of device or medium as long as the device or medium is capable of storing the program P. The storage medium may be referred to as a memory.

The management server 10, the advertisement server 40, and the terminal 20 can implement the functions of a plurality of functional units as described in the example embodiment by reading the program P stored in the storage medium and executing the read program P.

The program P of the present disclosure may be provided for the management server 10, the advertisement server 40, and the terminal 20 via any transmission medium (a communication network, broadcast waves, or the like) that is capable of transmitting the program P. For example, without limitation, the management server 10, the advertisement server 40, and the terminal 20 implement the functions of the plurality of functional units as described in the example embodiment by executing the program P that is downloaded via the Internet or the like.

Some example embodiments of the present disclosure can be implemented in the form of a data signal that is embedded in a carrier wave, in which the program P is embodied with electronic transmission.

At least a part of the processing in the management server 10, the advertisement server 40, and the terminal 20 may be implemented with cloud computing that is configured with one or more computers.

A configuration in which at least a part of the processing in the terminal 20 is performed by the management server 10 may be adopted. In this case, a configuration in which at least a part of processing of the processing of each functional unit of the control unit 21 of the terminal 20 is performed by the management server 10 may be adopted.

A configuration in which at least a part of the processing in the management server 10 is performed by the terminal 20 may be adopted. In this case, a configuration in which at least a part of processing of the processing of each functional unit of the control unit 11 of the management server 10 is performed by the terminal 20 may be adopted.

In a similar manner, a configuration in which at least a part of the processing in the advertisement server 40 is performed by the management server 10 may be adopted.

Unless otherwise explicitly noted, the configuration for determination in the example embodiment of the present disclosure is not essential, and desired (or alternatively, predetermined) processing may be performed when a determination condition is satisfied or desired (or alternatively, predetermined) processing may be performed when a determination condition is not satisfied.

Note that the programs according to the present disclosure may be implemented using, for example, without limitation, a script language such as ActionScript and/or JavaScript (registered trademark), an object-oriented programming language such as Objective-C and/or Java (registered trademark), a markup language such as HTML5, or the like.

One Example Embodiment

An overview of the present example embodiment will be described. In the present example embodiment, in the terminal 20, when video information of an advertisement is downloaded at the time of executing an application program for displaying the advertisement, regarding video information that may be displayed, not all but only a part (without limitation, an example of the first video data) of the video information is downloaded. Thus, in the terminal 20, storage capacity is prevented from being pressed (or alternatively, consumed) as compared to when an entirety of the video information of the advertisement is downloaded.

Functional Configuration (1) Functional Configuration of Terminal

As illustrated in FIG. 1, the functions to be implemented by the control unit 21 of the terminal 20 include a function implemented by an advertisement processing unit 211 and a function implemented by a display processing unit 212.

The advertisement processing unit 211 executes general processing related to advertisements to be displayed in the terminal 20. The advertisement processing unit 211 executes processing related to advertisements by executing an advertisement application for advertisement display that is stored in the storage 28. The advertisement application is an application program for displaying an advertisement together with various contents such as web contents, and the types of such an advertisement include, but are not limited to, a video, a still image, text, and voice. When the advertisement application is executed, the advertisement processing unit 211 transmits an advertisement information transmission request including information relating to the terminal 20 (which may include information relating to a user of the terminal 20) to the management server 10 via the communication I/F 22. It is desired that the information relating to the terminal 20 included in the advertisement information transmission request (information relating to a user of the terminal 20) be information with which the management server 10 can identify in what degree the management server 10 transmits advertisements to the terminal 20, and for example, without limitation, a communication speed (bps) of the terminal 20, a communication history of the terminal 20, preference information of the user, or the like. Based on these pieces of information, what degree and which advertisement information are to be transmitted to the terminal 20 can be identified in the management server 10. Note that transmission of the advertisement information transmission request is not always desired. For example, when an advertisement to be downloaded or a volume (e.g., data volume or data size) of the advertisement to be downloaded is determined in advance or is specified by a user, the advertisement processing unit 211 may be configured to directly access the advertisement server 40 and acquire the advertisement of the video without transmitting the advertisement information transmission request to the management server 10.

Figure 7A:
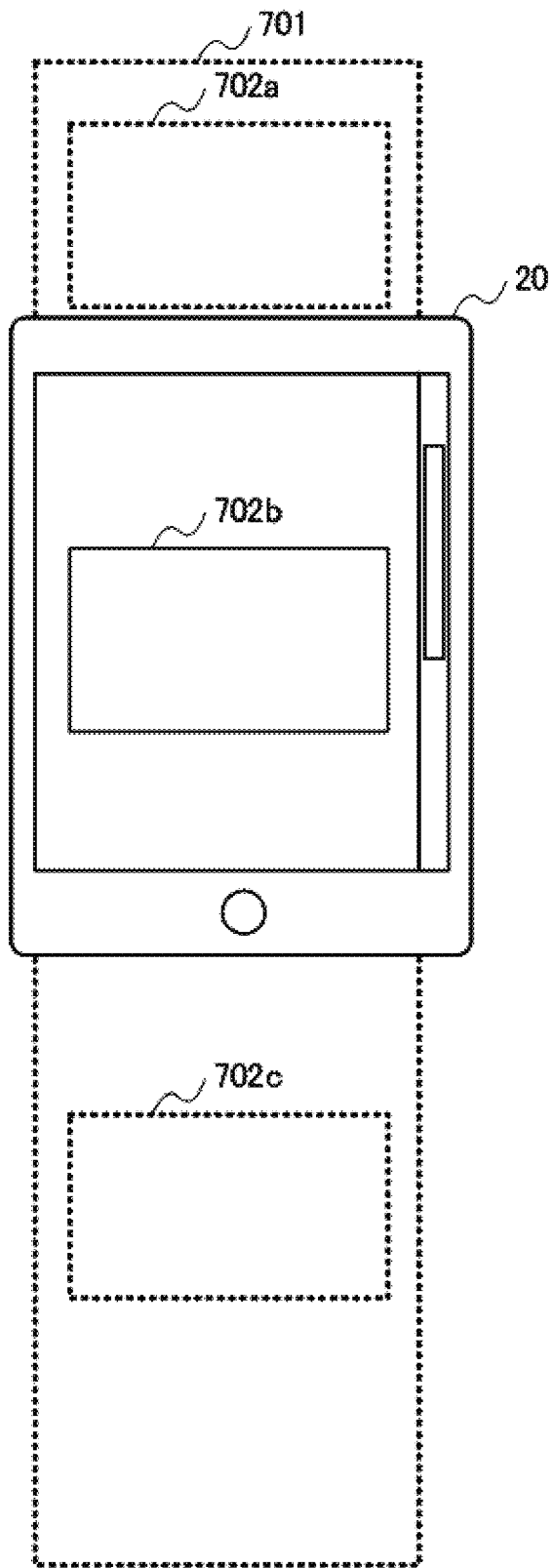
FIGS. 7A and 7B are each a diagram illustrating an example of a display mode of an advertisement in the terminal.

The advertisement processing unit 211 receives file position information that indicates a location of the video data of the advertisement transmitted from the management server 10 via the communication I/F 22, in accordance with the advertisement information transmission request. Then, the advertisement processing unit 211 transmits the video information of the advertisement stored in the address indicated by the file position information to the advertisement server 40 via the communication I/F 22. In this case, the advertisement processing unit 211 identifies the video information to be downloaded with reference to the file position information, and creates advertisement management information (e.g., a database) 200 illustrated in FIG. 2. Then, according to the criterion (priority) described in the advertisement management information 200, regarding the video information of a plurality of advertisements, the advertisement processing unit 211 transmits an address in which the desired video information is stored to the advertisement server 40 via the communication I/F 22 according to a desired (or alternatively, predetermined) criterion so that the video information of the advertisement exists in the storage 28 of the terminal 20 when the advertisement is actually displayed. Then, when the video of the advertisement transmitted from the advertisement server 40 is displayed in a display region for the video of the display unit 24, the advertisement processing unit 211 gives a command to the display processing unit 212 so that the video is displayed in the display region. The details of the advertisement management information 200 will be described later. Note that the display region for the video refers to a display region in the contents that is provided by the advertisement application, and for example, as illustrated in FIG. 7A, refers to a region such as regions 702a, 702b, and 702c in each of which, when there are contents 701 to be displayed in the terminal 20, a video of an advertisement in the contents 701 can be reproduced.

The advertisement processing unit 211 has a function of managing processing order of download of the videos regarding videos indicated by the file position information transmitted from the management server 10. The advertisement processing unit 211 downloads or un-downloaded video information according to a desired (or alternatively, predetermined) criterion regarding various advertisements. The advertisement processing unit 211 may have a function of adjusting the priority when the video information of the advertisements is downloaded. The processing of download performed by the advertisement processing unit 211 will be described later in detail with reference to FIG. 5, and the adjustment of priority of the video information will be described later in detail with reference to FIG. 6.

When the advertisement processing unit 211 reproduces the video of the advertisement in the display unit 24, the advertisement processing unit 211 requests a succeeding part (without limitation, an example of the second video data) of the reproduced video from the advertisement server 40 in the communication I/F 22. Then, the advertisement processing unit 211 reproduces a video transmitted from the advertisement server 40 as the succeeding part of the reproduced video in accordance with the request, and thereby implements reproduction of the video of one advertisement.

The display processing unit 212 displays display data generated by the control unit 21 via the display unit 24. The display processing unit 212 has a function of converting data for display into pixel information, and writing into the frame buffer of the display unit 24. The display processing unit 212 writes the data for display related to the video information of the advertisement transmitted from the advertisement server 40 in the frame buffer of the display unit 24, and thereby causes the display unit 24 to display the advertisement in a desired (or alternatively, predetermined) display region. The display processing unit 212 provides first display based on a preceding part (without limitation, an example of the first video data) of the video data of the advertisement in accordance with a command from the advertisement processing unit 211. The display processing unit 212 provides second display based on a succeeding part (without limitation, an example of the second video data) of the video data of the advertisement to be downloaded in association with the first display in accordance with a command from the advertisement processing unit 211.

The storage 28 may store personal information of a user. When the personal information of a user is recorded, the personal information of the user may be information relating to the user, and for example, without limitation, at least one of the name, the age, the gender, the occupation, or the preference. Pieces of information such as information (a total reproduction count, a reproduction count, identification information of a reproduced advertisement, or the like) of the advertisement viewed by the user (reproduced advertisement) and a purchase history obtained when the user purchased some goods from the viewed advertisement may be included. The personal information can be used as the information relating to the user. The personal information may be stored in the storage 15 of the management server 10 as well.

(2) Functional Configuration of Server

As illustrated in FIG. 1, the functions to be implemented by the control unit 11 of the management server 10 include functions of a determination unit 111 and an advertisement information transmission unit 112. The management server 10 stores, in the storage 15, a list of advertisements being information with which distributable advertisements can be uniquely identified, and the control unit 11 identifies the advertisement to be transmitted to the terminal 20 of the user with reference to the list of advertisements.

Based on the advertisement information transmission request transmitted from the terminal 20, the determination unit 111 determines an advertisement to be displayed in the terminal 20. Based on the information relating to the user included in the advertisement information transmission request transmitted from the terminal 20, the determination unit 111 determines the advertisement to be displayed in the terminal 20 of the user out of the list of advertisements. In this case, for example, without limitation, by using the preference of the user, the history of the advertisements that the user has previously viewed, and the like, the determination unit 111 may identify an advertisement that is similar to such preferences and the type of the advertisements that the user has viewed as the advertisement to be displayed in the terminal 20 of the user. In this case, at the time of activation of the advertisement application in the terminal 20 of the user, regarding each video, the determination unit 111 identifies the volume of a part of the video (the length of the video) to be downloaded based on the information relating to the user, and download the part (e.g., preceding part, without limitation, an example of the first video data). Here, the preceding part of the video refers to a part from the beginning of the video to an intermediate part thereof. The intermediate part thereof may be any part between the beginning and the end of the video, and the preceding part need not necessarily be the first half of the video. In other words, this enables each terminal 20 to download an advertisement of a volume that is appropriate for the terminal 20. The information relating to the user may include information relating to the communication speed of the terminal 20. The determination unit 111 may determine the volume according to the communication speed of the terminal 20, for example. For example, at the time of activation of the application or the like, data of X bytes may be the volume to be downloaded when the communication speed of the terminal 20 is a desired (or alternatively, predetermined) threshold or higher (e.g., faster), and data of Y bytes which are larger than X bytes may be the volume to be downloaded when the communication speed of the terminal 20 is less (e.g., slower) than the desired (or alternatively, predetermined) threshold. When the communication speed of the terminal 20 is less than the desired (or alternatively, predetermined) threshold, download of the succeeding data (without limitation, an example of the second video data) may not be completed when the advertisement is reproduced and reproduction of the video may be suspended halfway. However, if data of Y bytes is downloaded in advance, such concern can be eliminated. On the other hand, when the communication speed is the desired (or alternatively, predetermined) threshold or higher, even when the volume of the succeeding data to be downloaded is large, the succeeding data can be downloaded in time for reproduction. Thus, by reducing the volume of the data downloaded first (without limitation, an example of the first video data), the storage capacity of the terminal 20 can be prevented from being pressed (or alternatively, consumed a lot) by the video data of the advertisement.

Note that the description above illustrates an example in which the data of X bytes is the volume to be downloaded when the communication speed of the terminal 20 is the desired (or alternatively, predetermined) threshold or higher and the data of Y bytes which are larger than X bytes is downloaded when the communication speed of the terminal 20 is less than the desired (or alternatively, predetermined) threshold. However, the relationship of this example may be inversed. In other words, the data of X bytes may be the volume to be downloaded when the communication speed of the terminal 20 is the desired (or alternatively, predetermined) threshold or higher, and the data of Y bytes which are smaller than X bytes may be the volume to be downloaded when the communication speed of the terminal 20 is less than the desired (or alternatively, predetermined) threshold. On the condition that the communication speed of the terminal 20 is high, even when data of a certain volume or more is downloaded, the download can be made in time for the display of the video itself no matter which video is displayed, and when a large volume is downloaded in advance, the probability that the reproduction of the video is stopped due to failure of the download of the data (e.g., succeeding data) of the video in the middle of the reproduction can be reduced. In contrast, on the condition that the communication speed of the terminal 20 is low, when the volume to be downloaded is reduced, the download can be completed before the start of display no matter which video is displayed. Which of the cases is selected may be configured by the user with the terminal 20. Further, the determination unit 111 transmits the information indicating a plurality of the determined advertisements and the volume to be downloaded to the advertisement information transmission unit 112.

The advertisement information transmission unit 112 identifies a location in which the advertisements are stored (e.g., address of the advertisement server 40), based on the information indicating the plurality of advertisements transferred from the determination unit 111. Further, the advertisement information transmission unit 112 generates file position information in which identification information of each of the plurality of advertisements, information indicating the stored location of the plurality of advertisements, and the volume to be downloaded regarding each of the plurality of advertisements are associated with each other. The advertisement information transmission unit 112 performs the transmission to the terminal 20 via the communication I/F 14.

Note that the advertisement server 40 is a general file management server and an information processing device having a function of distributing video information of the advertisement specified from the terminal 20, and the configuration of the advertisement server 40 is the same or substantially similar to that of the management server 10. The advertisement server 40 transmits a preceding part of the specified volume (a part of the video data), which is video information of the advertisement located in the address specified from the terminal 20, to the terminal 20.

Data

Here, the advertisement management information 200 will be described. FIG. 2 is a conceptual diagram of data illustrating a data configuration example of the advertisement management information 200. The advertisement management information 200 is information for managing a download state of the video information of each advertisement in the terminal 20.

As illustrated in FIG. 2, the advertisement management information 200 is information in which an advertisement ID 201, a display region ID 202, a download state 203, a display probability 204, and a priority 205 are associated with each other.

The advertisement ID 201 is identification information for uniquely identifying an advertisement. The advertisement processing unit 211 can identify the advertisement ID 201, based on the file position information.

When a display region in which an advertisement indicated by a corresponding advertisement ID is displayed on the contents is determined, the display region ID 202 is identification information indicating the display region. When a display region in which an advertisement indicated by a corresponding advertisement ID is displayed is not determined, information indicating that the display region is not determined is shown in the display region ID 202. As the information indicating that the display region is not determined, in the example illustrated in FIG. 2, an example using "-" is illustrated. However, this is not limited to "-". The display region ID 202 is updated by the advertisement processing unit 211 each time the display region is allocated for the advertisement.

The download state 203 indicates a download state of the video data of a corresponding advertisement. The download state is information indicating how much video data has been successfully downloaded. Here, the download state is denoted by a ratio (e.g., percentage) with respect to the entire video, but is not limited to this, and for example, may be managed with a binary value of "downloaded" and "un-downloaded". The download state 203 is updated by the advertisement processing unit 211 each time a state of the download of the video data of the advertisement is changed.

The display probability 204 is information indicating a probability that the advertisement indicated by a corresponding advertisement ID is displayed. The information is information that is set and updated by the advertisement processing unit 211 as appropriate. As the display probability, for example, the advertisement processing unit 211 sets the display probability 204 of the advertisement whose display region for the contents is set at a scrolled destination with scroll of or the like, to be a higher value. With respect to the advertisement that has been displayed before or the advertisement that is displayed halfway and is stopped being reproduced (when the reproduction is stopped by the user, when the reproduction is stopped in response to the stop of the display in the display region due to screen switch, or the like), the display probability 204 of the advertisement is set to be a lower value because such advertisement is assumed to have a low probability of being displayed in future. A specific example of the setting processing of the display probability herein will be described with reference to FIG. 7A. As illustrated in FIG. 7A, it is assumed that the advertisement (here, referred to as an advertisement A) is displayed (reproduced) in the display region 702b in the display unit 24. In this state, in a situation where the download of the advertisement A has not been completed, the advertisement processing unit 211 sets the display probability (here, referred to as P1) of the advertisement A to be higher than those of other advertisements in order to prioritize the download of the advertisement A. In this situation, it is assumed that the user performs the scroll operation to slide the contents 701 upward. In this case, the display region 702b is also slid upward in the screen due to the scroll of the contents 701. With this, the display region is no longer displayed in the display unit 24 of the terminal 20 and reproduction of the advertisement A is stopped. In this case, it is assumed that the user views the contents of the succeeding part sequentially. Accordingly, the probability that the user moves the position of the display region 702b of the advertisement A back to the position to be displayed in the display unit 24 again to reproduce the advertisement A is assumed low. In view of this, the advertisement processing unit 211 sets the display probability P1 set for the advertisement A to be P2, which is lower than P1. Moreover, due to the scroll, the probability that the display region 702c is displayed in the display unit 24 is increased. Thus, the advertisement processing unit 211 increases the display probability (here, referred to as P3) of the advertisement (here, referred to as an advertisement B) to be displayed in the display region 702c. The advertisement processing unit 211 sets the display probability P3 of the advertisement B to be a value higher than P2. Therefore, when the content 701 is scrolled and slid upward in the screen in the middle of downloading the video data of the second half of the advertisement A (without limitation, an example of the second video data), the advertisement A is no longer displayed in the display region of the display unit 24, the reproduction of the advertisement A is stopped, and the display probability P1 is reduced lower than P2. In this case, based on the display probability P1 or P2, the video data of the first-half part (without limitation, an example of the first video data) or the video data of the second-half part (without limitation, an example of the second video data) of the advertisement B may or may not be downloaded. The download of the video data of the second-half part of the advertisement A may be performed at a communication speed that is lower than the download of the video data of the first-half part or the second-half part of the advertisement B. Note that a more detailed description related to the download of the advertisement will be provided in the later section.

The priority 205 is information indicating priority of the advertisement indicated by the corresponding advertisement ID. The priority 205 is information used for determining the order for downloads of the video information of the advertisements when the advertisement processing unit 211 downloads advertisements and the processing order of the downloads thereof is in the same line. The above describes the configuration of the advertisement management information 200.

Owing to the presence of the advertisement management information (e.g., database) 200, the advertisement processing unit 211 can manage the advertisements to be downloaded and determine the order of the downloads of the advertisements.

Operation

Figure 3:
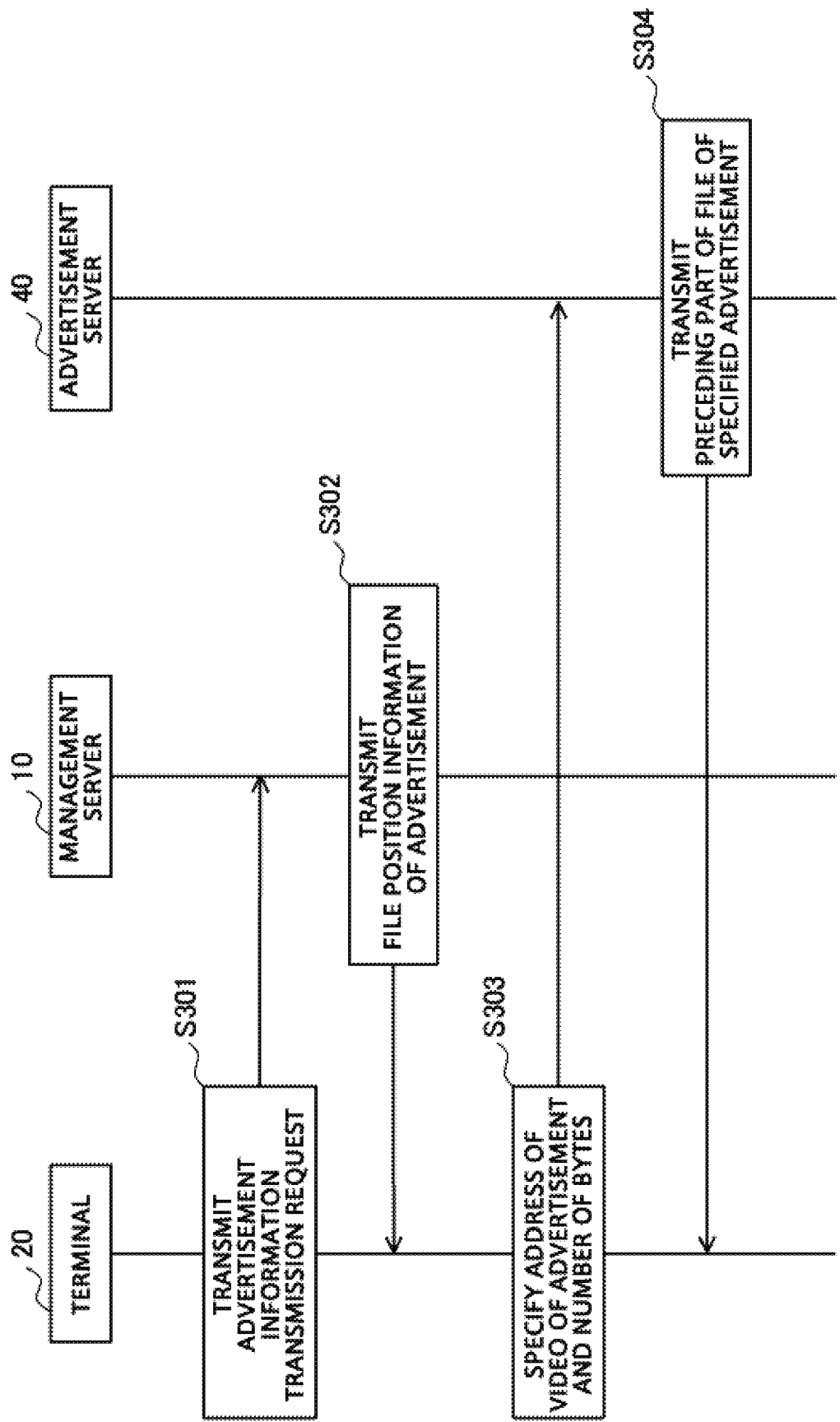
FIG. 3 is a diagram illustrating an example of a sequence of processing of the communication system according to an example embodiment.

First, communication between the terminal 20, the management server 10, and the advertisement server 40 according to the present example embodiment will be described with reference to the sequence diagram illustrated in FIG. 3.

When the terminal 20 activates the advertisement application, the terminal 20 transmits the advertisement information transmission request to the management server 10 (Operation S301).

When the management server 10 receives the advertisement information transmission request, the management server 10 generates the file position information indicating the stored location of the advertisement to be displayed by the terminal 20, based on the information included in the advertisement information transmission request, and transmits the file position information to the terminal 20 (Operation S302).

When the terminal 20 receives the file position information from the management server 10, the terminal 20 transmits an address described in the file position information and information indicating the volume (e.g., a data volume, a data size, or a number of bytes) to be received to the advertisement server 40 (Operation S303).

When the advertisement server 40 receives the specification of the address and the specification of the volume to be received, the advertisement server 40 transmits (distributes) the advertisement stored in the specified address from the beginning of the video information of the advertisement by the amount of the specified volume to the terminal 20 (Operation S304).

In this manner, in the communication system 1, when the terminal 20 downloads the video information of one or a plurality of (two or more) advertisements at the time of execution of the advertisement application, the capacity (e.g., storage capacity) of the terminal 20 can be prevented from being pressed (or alternatively, consumed too much) by downloading in advance a part of the video in the initial stage. In other words, consumption of the storage 28 of the terminal 20 can be reduced. At the time of start of reproduction of the advertisement video, a certain amount of data is present and thus the probability of occurrence of a delay in the reproduction can be reduced.

Next, the operation of the terminal 20 for implementing the processing illustrated in FIG. 3 will be described with reference to the flowcharts illustrated in FIG. 4 to FIG. 6.

Figure 4:
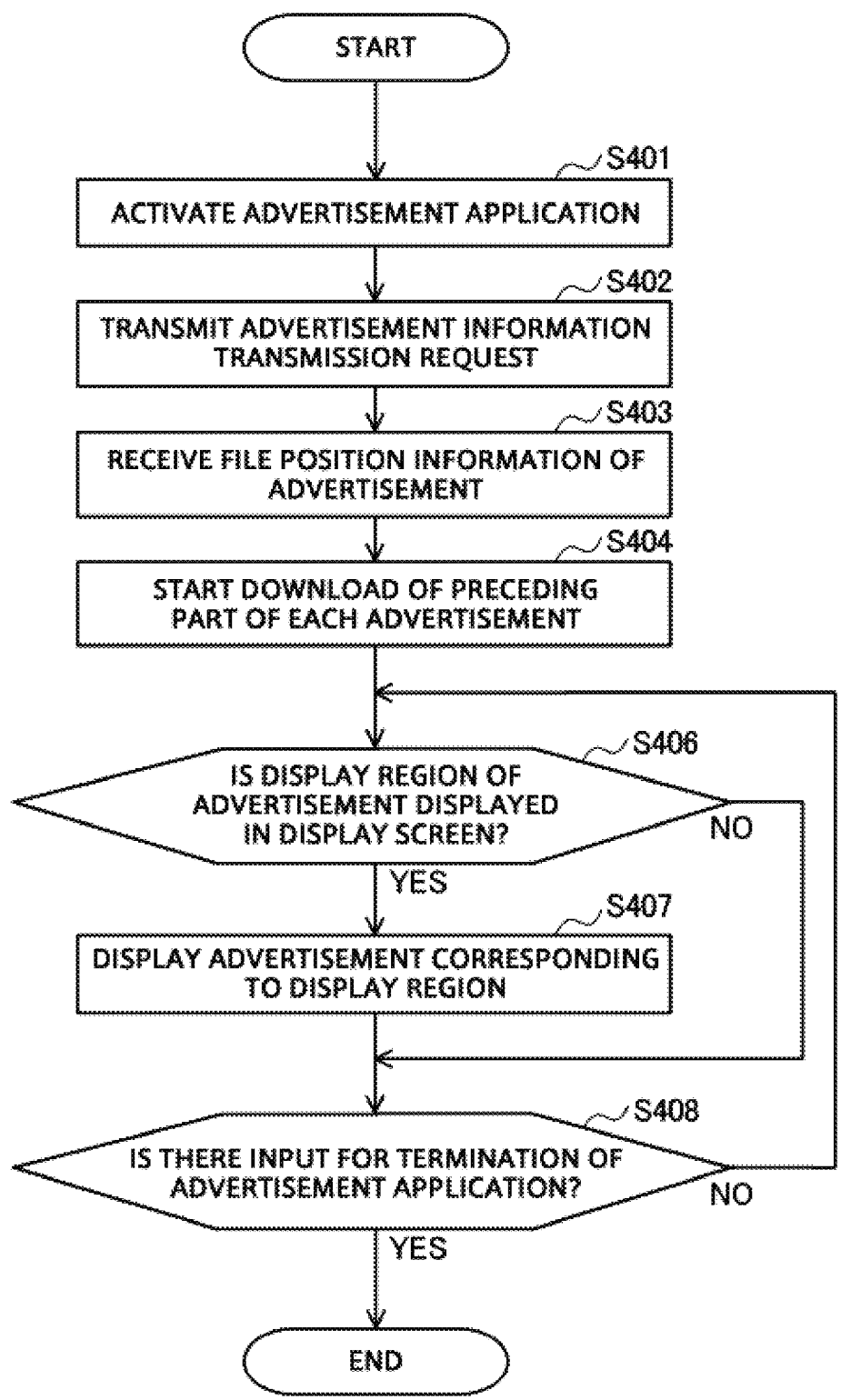
FIG. 4 is a flowchart illustrating operation related to display processing of an advertisement in a terminal.

FIG. 4 is a flowchart illustrating display processing of the advertisement, which is an operation of the terminal 20, when the advertisement application is executed.

The control unit 21 of the terminal 20 activates the advertisement application, triggered by input from the user or activation of a desired (or alternatively, predetermined) application (an application that is set to be activated together with the advertisement application) (Operation S401). Note that the activation of the advertisement application may be triggered by the download of the desired (or alternatively, predetermined) application when the advertisement application has already been installed or may be triggered by the download of the advertisement application. The processing of the advertisement may be configured to be executed by a function of the program of the desired (or alternatively, predetermined) application described above, instead of being executed as an application described above.

When the advertisement application is activated, as its initial processing, the advertisement processing unit 211 transmits the advertisement information transmission request that includes the information relating to the user and the information relating to the terminal 20 to the management server via the communication I/F 22 (Operation S402). The communication I/F 22 of the terminal 20 receives the file position information indicating the location of the advertisement transmitted from the management server 10, in response to the transmission of the advertisement information transmission request (Operation S403). The communication I/F 22 transmits the received file position information to the advertisement processing unit 211.

When the advertisement processing unit 211 receives the file position information, the advertisement processing unit 211 starts download of a part of the video of each advertisement indicated in the file position information (preceding part, without limitation, an example of the first video data) (Operation S404). In other words, regarding the plurality of advertisements indicated in the received file position information, the advertisement processing unit 211 transmits, to the advertisement server 40 via the communication I/F 22, the address indicating the location and the information indicating the volume to download according to a desired (or alternatively, predetermined) criterion from the video of the advertisement having higher priority. The advertisement processing unit 211 sequentially executes the downloads of the advertisements, and the number of downloads corresponds to the available number of downloads from the advertisement server 40.

The advertisement processing unit 211 determines whether the display region of the advertisement is displayed in the display unit 24 (Operation S406). When the display region of the advertisement is displayed in the display unit 24 (YES in Operation S406), the advertisement processing unit 211 refers to the advertisement management information 200 to give a command to the display processing unit 212 to display the video of the advertisement associated with the display region. Then, the display processing unit 212 reads the video data of the specified advertisement from the storage 28, and displays the video data on the display unit 24 (Operation S407). In this case, the advertisement processing unit 211 requests the advertisement server 40 to transmit a succeeding part (without limitation, an example of the second video data) of the advertisement that has started to be reproduced. Then, when the reproduction of the advertisement is continued, the succeeding part of the advertisement is reproduced subsequently to the preceding part of the advertisement. In this manner, the control unit 21 can display the entire video information of the advertisement on the display unit 24 without causing interruption.

The control unit 21 determines whether there is input for termination of execution of the advertisement application from the user via the input/output unit 23 (Operation S408). When there is input for the termination of the advertisement application (YES in Operation S408), the control unit 21 terminates the processing, and when there is no input (NO in Operation S408), the control unit 21 returns to the processing of Operation S406. The above describes the operation related to the display processing of the video of the advertisement performed by the terminal 20. Note that the advertisement downloaded in the flow of FIG. 4 may be stored in the storage 28. When the advertisement is stored, the advertisement stored in the storage 28 is displayed in the display region of the display unit 24 in S407.

Next, an operation performed by the advertisement processing unit 211 when each advertisement is downloaded from the advertisement server 40 will be described. The number of advertisements that can be downloaded by the terminal 20 from the advertisement server 40 at a time is restricted by reasons such as a communication band and an advance setting. Thus, the advertisement processing unit 211 downloads each advertisement from the advertisement server 40 according to, for example, the priority. FIG. 5 is a flowchart illustrating the download processing.

Figure 5:
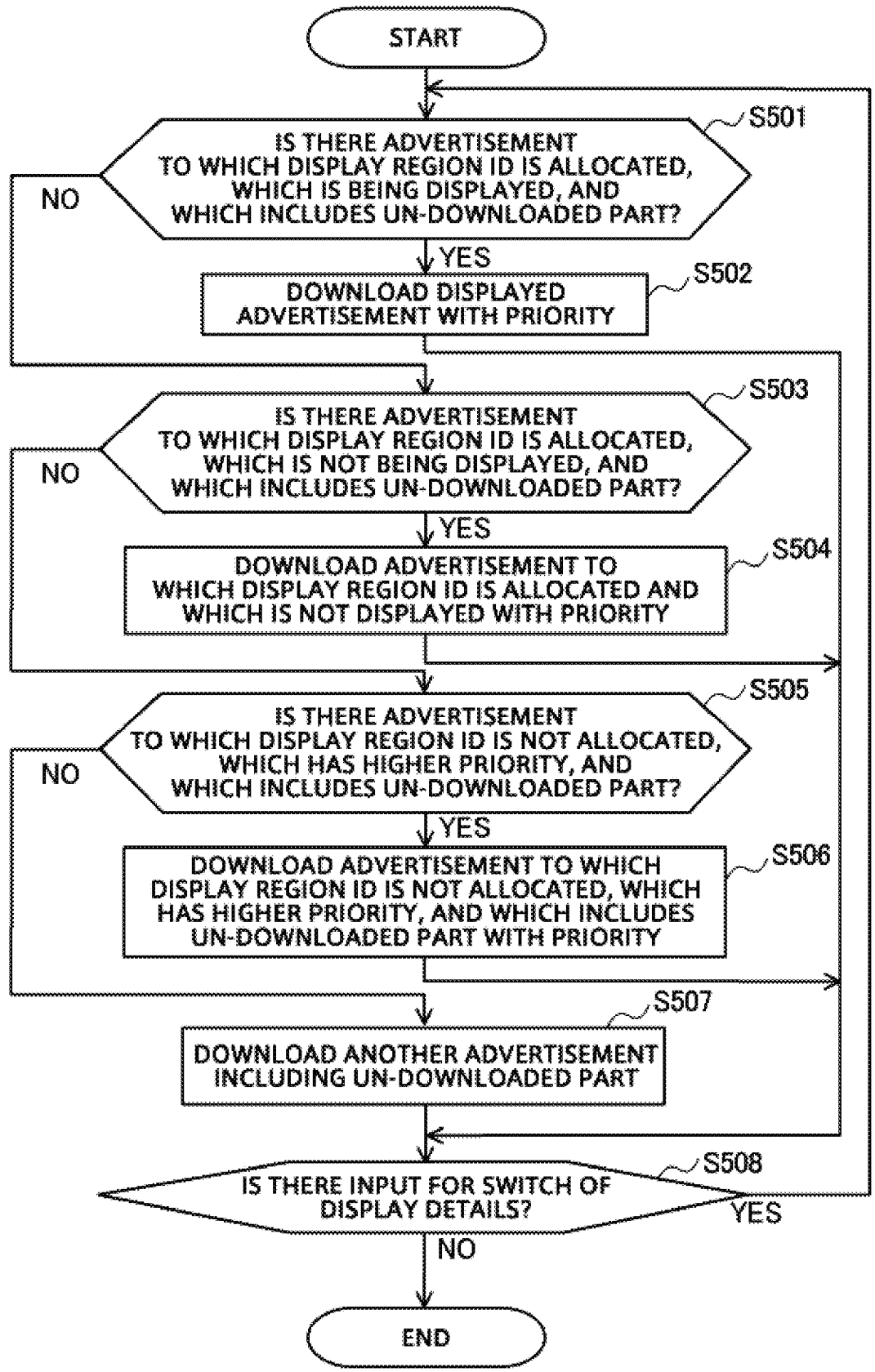
FIG. 5 is a flowchart illustrating operation related to download processing of an advertisement in the terminal.

As illustrated in FIG. 5, the advertisement processing unit 211 refers to the advertisement management information 200 and determines whether there is an advertisement, to which a display region ID 202 is allocated, a downloaded part of which (without limitation, an example of the first video data) is being reproduced in the display unit 24, and entire video of which to be reproduced has not been completely downloaded (e.g., at least a portion (without limitation, an example of the second video data) of which has not been completely downloaded) (Operation S501). When there is an advertisement to which the display region ID is allocated, which is being reproduced, and which includes an un-downloaded part (YES in Operation S501), the advertisement processing unit 211 prioritize the remaining (or succeeding) part of the video data of the advertisement, which is being currently displayed, to be downloaded from the advertisement server 40 (Operation S502), and proceeds to the processing of Operation S508. Here, the un-downloaded part refers to a succeeding part (without limitation, an example of the second video data) of the advertisement that has started to be reproduced, but may include a preceding part (without limitation, an example of first video data) of a new advertisement. Here, the new advertisement may be generated when an entirety of the downloaded advertisement is reproduced, and for example, the new advertisement needs to be provided for the user, or the new advertisement is registered with the advertisement server 40 and needs to be provided for the terminal 20 of the user.

When there is no advertisement to which the display region ID is allocated, which is being reproduced, and which includes an un-downloaded part (No in Operation S501), the advertisement processing unit 211 refers to the advertisement management information 200 and determines whether there is an advertisement to which the display region ID 202 is allocated, which is not being reproduced, and which includes an un-downloaded part (Operation S503). When there is an advertisement to which the display region ID is allocated, which is not being reproduced, and which includes an un-downloaded part (YES in Operation S503), the advertisement processing unit 211 downloads, from the advertisement server 40, an advertisement to which the display region ID is allocated, which is not displayed, and which includes an un-downloaded part (Operation S504), and proceeds to the processing of Operation S508. In this case, when there are a plurality of advertisements to which the display regions ID are allocated, which are not being reproduced, and which include un-downloaded parts, the advertisement processing unit 211 downloads with priority an advertisement that has higher priority among the advertisements. One having higher priority refers to an advertisement in which the priority 205 of the advertisement management information 200 is set to be "high", and for example, the priority (display probability 204) is high when the contents are scrolled by the user and the display region of the succeeding advertisement is about to be displayed.

When there is no advertisement to which the display region ID is allocated, which is not being reproduced, and which includes an un-downloaded part (NO in Operation S503), the advertisement processing unit 211 refers to the advertisement management information 200 and determines whether there is an advertisement to which the display region ID is not allocated, which has higher priority, and which includes an un-downloaded part (Operation S505). Here, one having higher priority refers to a higher probability of being displayed in the display unit or a higher probability of being viewed by the user, and refers to whether the priority 205 indicates "high" in the advertisement management information 200. When there is an advertisement to which the display region ID is not allocated, which has higher priority, and which includes an un-downloaded part (YES in Operation S505), the advertisement processing unit 211 downloads the advertisement from the advertisement server 400 (Operation S506), and proceeds to the processing of Operation S508.

When there is no advertisement to which the display region ID is not allocated, which has higher priority, and which includes an un-downloaded part (NO in Operation S505), the advertisement processing unit 211 downloads another advertisement including an un-downloaded part (for example, an advertisement having low priority 205) (Operation S507), and proceeds to the processing of Operation S508.

In Operation S508, the input/output unit 23 determines whether there is input for performing switch of display details of the contents from the user (Operation S508). Here, the switch of the display details refers to a case that the display details is changed in the display unit 24 of the terminal 20, and may be caused by input from the user such as press of a video reproduction button, input for stopping reproduction of video, input for shifting from a displayed page of the contents to another page, or scroll input for the displayed contents. When there is input for switch of the display details (YES in Operation S508), the advertisement processing unit 211 returns to the processing of Operation S501, and when there is no such input (NO in Operation S508), the advertisement processing unit 211 terminates the processing. The processing illustrated in FIG. 5 is executed in parallel with the processing of Operations S404 to S408 illustrated in FIG. 4. In other words, in a case of NO in Operation S508 of the processing illustrated in FIG. 5, it may be expressed that the processing proceeds to Operation S408 of FIG. 4.

Note that, in order that the operation illustrated in FIG. 5 is implemented, the advertisement processing unit 211 may be configured to set the priority for each advertisement indicated in the advertisement management information 200 and change the priority as appropriate, and thereby download the video data of the advertisement from the advertisement server 40, from the video data having higher priority. As the priority used in this case, simply, video data may be downloaded in sequential order from video data having a higher display probability for display. In other words, when the video data is downloaded in sequential order from the video data having a higher display probability, regarding each advertisement, the video data may be downloaded in sequential order from the video data having a higher probability of being displayed, without taking allocation or non-allocation of the display region ID, preference of the user, or the like into consideration.

Finally, adjustment processing of adjusting priority of the advertisements when the advertisements is downloaded will be described. FIG. 6 is a flowchart illustrating processing of adjusting priority related to download of videos of the advertisements in the terminal 20.

Figure 6:
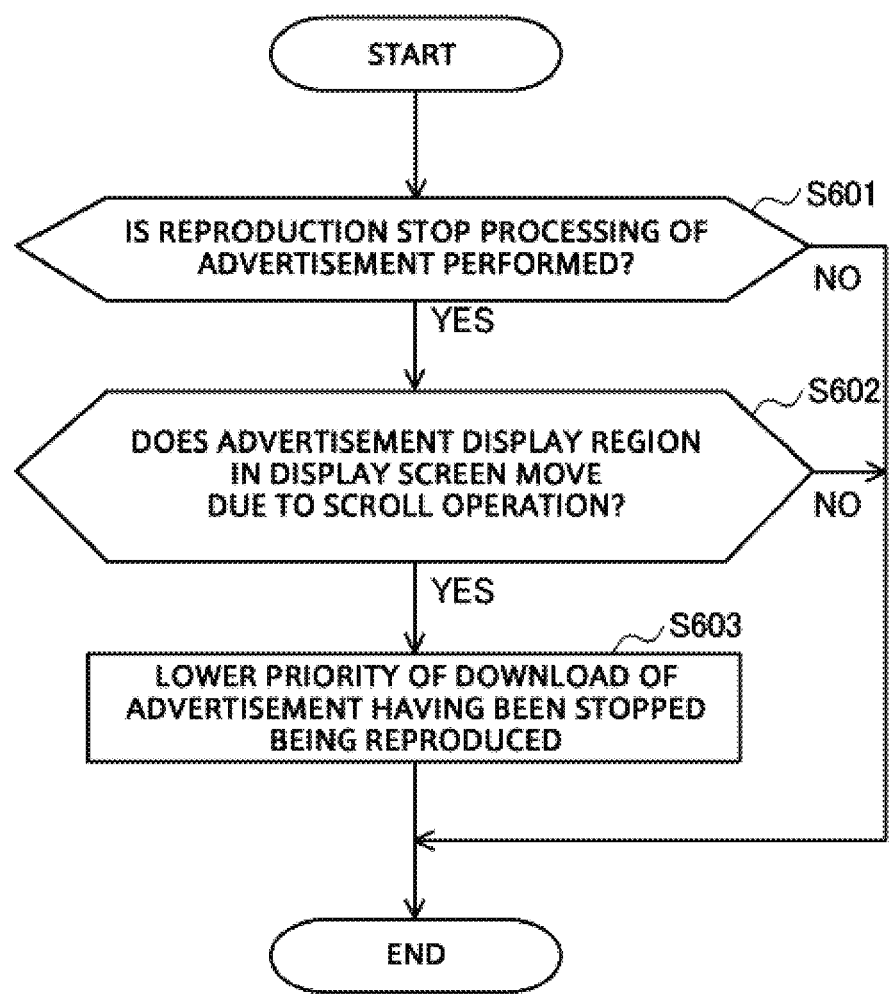
FIG. 6 is a flowchart illustrating operation related to adjustment processing of priority of advertisements in the terminal.

As illustrated in FIG. 6, the advertisement processing unit 211 determines whether reproduction stop processing of the advertisement is performed (Operation S601). Here, the reproduction stop processing of the advertisement includes a case in which the user performs input for stopping reproduction of the advertisement, and a case in which the advertisement application automatically stops the reproduction due to the display region of the advertisement being moved out of the display range of the display unit 24.

Figure 7B:
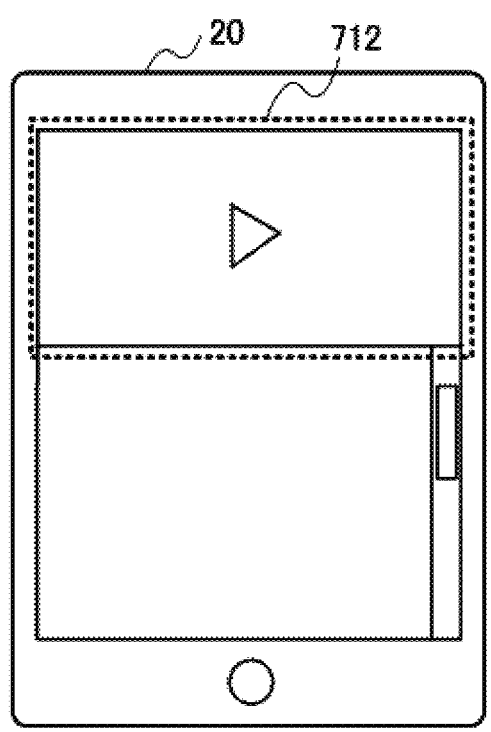

When reproduction stop processing of the advertisement is performed (YES in Operation S601), the advertisement processing unit 211 determines whether the display region in which the advertisement is displayed moves due to scroll operation for the contents in the display screen of the display unit 24 (Operation S602). When no reproduction stop processing of the advertisement is performed (NO in Operation S601), the processing is terminated. Here, examples of the cases in which the display region of the advertisement moves and does not move due to scroll operation will be described with reference to FIGS. 7A and 7B. FIG. 7A illustrates a case in which the display region of the advertisement moves due to scroll operation, and FIG. 7B illustrates a case in which the display region of the advertisement does not move due to scroll operation. As illustrated in FIG. 7A, when the contents 701 provided by the advertisement application are displayed and are capable of being scrolled in the display unit 24 of the terminal 20, the display regions 702a, 702b, and 702c in the contents 701 move due to the scroll operation of the user. In such a case, the advertisement processing unit 211 determines that the display region of the advertisement moves due to scroll operation. On the other hand, as illustrated in FIG. 7B, in some cases, a display region 712 of the advertisement does not move on the screen. In such a case, the advertisement processing unit 211 determines that the display region of the advertisement does not move due to scroll operation. Note that, when the display mode as illustrated in FIG. 7B is employed, in the advertisement management information 200, the display region associated with each advertisement is all the same region and its display order may be set.

When it is determined that the display region in which the advertisement is being displayed does not move due to scroll operation (NO in Operation S602), the advertisement processing unit 211 terminates the processing. On the other hand, when it is determined that the display region in which the advertisement is being displayed moves due to scroll operation (YES in Operation S602), it may be assumed that, in the advertisement processing unit 211, the probability that the advertisement that has been stopped being reproduced is viewed by the user in future is low (in other words, the probability that the user performs scroll operation one more time to cause display of the display region so as to be moved back to the display unit to reproduce the advertisement is low). Thus, the advertisement processing unit 211 lowers the priority for download of the advertisement that has been stopped being reproduced (Operation S603), and terminates the processing. The advertisement processing unit 211 executes the adjustment processing of the priority of the videos illustrated in FIG. 6 between Operations S404 and S408 in the processing illustrated in FIG. 4. Note that the description herein expresses that the display region of the advertisement in the contents is moved out of the display unit 24. This expression, however, is not limited to a case that the display region is determined as a frame in which the advertisement is displayed. In other words, the display region of the advertisement may simply mean a region in which the advertisement is displayed in a display region of the display unit 24. In other words, in Operation S602 of FIG. 6, the determination as to whether the advertisement display region in the display screen (display region of the display unit 24) moves due to scroll operation may be interpreted as the determination as to whether the advertisement displayed in the display screen of the display unit 24 moves out of the display screen due to scroll operation.

As has been described above, when the advertisement application is executed, the terminal 20 according to the present example embodiment downloads only a preceding part (without limitation, an example of the first video data) of a plurality of videos to be displayed in the advertisement application. In this manner, a situation in which the storage capacity of the terminal 20 is pressed by the video data of the advertisement can be mitigated or prevented. In other words, consumption of the storage 28 of the terminal 20 can be reduced. Regarding the videos of a plurality of desired advertisements, by downloading only the preceding part in advance, when an associated display region is displayed in the display unit 24, reproduction of the video of the advertisement can be immediately started regarding any of the videos. Then, when the reproduction of the video is started, the terminal 20 also downloads a succeeding part (without limitation, an example of the second video data) of the video during the reproduction unless the reproduction is suspended. Thus, the advertisement video can also be provided for a user who desires to view an entirety of the advertisement video without causing interruption.

Modifications of the Above Example Embodiment

Here, possible various modifications of the example embodiment described above will be described.

(1) In the example embodiment described above, the number of advertisements downloaded by the terminal 20 (the number of advertisements that the determination unit 111 of the management server 10 considers that the terminal 20 should download) may be different depending on the terminal 20.

For example, without limitation, the terminal 20 may arrange the number and the types of the advertisements to be downloaded to be different, based on a purchase history of the purchased advertised goods via the advertisement application. For example, when the number and the types of the advertisements to be downloaded are arranged to be different, the terminal 20 that has a purchase history of a large number of goods is a user who frequently purchases goods using the advertisements, and thus an arrangement may be made such that the user downloads a larger number of advertisements and a larger number of types of advertisements so as to be provided with a larger number of purchase opportunities of goods.

It may be assumed that the user of the terminal that has a purchase history of a small number of goods less frequently views the advertisements, and thus the number of advertisements to be downloaded may be reduced so that the storage capacity of the terminal 20 is not pressed. In this case, conversely, in order to provide a probability of having the user view a larger number of advertisements, the number of downloads of the advertisements for the terminal that has a purchase history of a small number of goods may be increased.

Instead of the purchase history of goods described above, the reproduction count of the advertisement may be used. In other words, when the reproduction count of the advertisement is used, the terminal 20 stores the number of advertisements that are reproduced until the end or by a certain length in a state in which the display region is displayed in the display unit, and based on the number, the terminal 20 may determine the number of advertisements to be downloaded. The number may be replaced by total reproduction time of the advertisements.

The description herein assumes a case that the number of advertisements to be downloaded is changed. However, the type of the advertisement to be downloaded may be changed according to a previous history of the user. For example, when the type of the advertisement to be downloaded is changed, for example, without limitation, if there are an advertisement having short reproduction time and an advertisement having long reproduction time regarding the same goods of the same company, the advertisement having long reproduction time may be distributed to the terminal 20 having the purchase history of a larger number of goods or a larger number of reproduction counts of the advertisement (the reproduction time is long), and the advertisement having short reproduction time may be distributed to the terminal 20 in which the purchase history of the smaller number of goods or the smaller number of reproduction counts of advertisement. In this manner, the advertisement that can deliver more detailed information can be distributed to the user who is considered to be more interested in the advertisements, and the advertisement that can plainly deliver information (e.g., that can deliver information that should be delivered in a shorter period of time) can be distributed to the user who is considered to be less interested in the advertisements.

As a specific implementation example, the terminal 20 (advertisement processing unit 211) counts the number of reproduced advertisements each time the advertisement is reproduced. Here, in the count of the number of reproductions of the advertisement, a certain advertisement may be counted as "reproduced" even when the advertisement is only slightly displayed in the display unit 24. Regarding a certain advertisement, when a desired (or alternatively, predetermined) ratio or more of a length of its video is displayed in the display unit 24, the advertisement may be counted as "reproduced". Regarding a certain advertisement, the advertisement may be counted as "reproduced" when the entire video thereof is displayed in the display unit 24. Regarding the advertisement to be counted, it is desirable to count the advertisement that is reproduced in a state of being displayed in the display unit (e.g., the advertisement that can be estimated to have been actually viewed by the user of the terminal 20).

Further, when the terminal 20 transmits the advertisement information transmission request, the terminal 20 also transmits the counted number of advertisements that are estimated to have been viewed. The management server 10 that has received this information compares the number of the advertisements reproduced in the terminal 20 with a desired (or alternatively, predetermined) threshold. When the reproduction count of the advertisement is less than the desired (or alternatively, predetermined) threshold, the determination unit 111 of the management server 10 determines the first advertisement as the advertisement to be received by the terminal 20. When the reproduction count of the advertisement is equal to or more than the desired (or alternatively, predetermined) threshold, the determination unit 111 determines, as the advertisement to be received by the terminal 20, the second advertisement that is different from the first advertisement or the advertisements of both of the second advertisement and the first advertisement. In other words, when the reproduction count of the advertisement counted in the terminal 20 is the first reproduction count, the terminal 20 receives a preceding part (without limitation, an example of the first video data) of the video data of the first advertisement from the advertisement server 40, and when the reproduction count of the advertisement counted in the terminal 20 is the second reproduction count that is greater than the first reproduction count, the terminal 20 receives a preceding part (without limitation, an example of the third video data) of the video data of the second advertisement that is different from the first advertisement and the video data (without limitation, an example of the first video data) of the first advertisement. Owing to the configuration, a larger amount of information (advertisements) can be provided for the user who can be estimated to view a larger number of advertisements.

Note that, the terminal 20 may be configured to be reset the reproduction count of the advertisement to be counted and the number of purchase histories at desired (or alternatively, predetermined) period intervals. By resetting the count and the number at desired (or alternatively, predetermined) period intervals, information that conforms to the current tendency of the user (whether the user frequently views the advertisements recently) can be obtained. In some example embodiments, regarding the reproduction count of the advertisement to be counted in the terminal 20 and the number of purchase histories, average values thereof for each desired (or alternatively, predetermined) period may be used. When the average value for each desired (or alternatively, predetermined) period is used, the advertisement to be provided can be changed in consideration of the transition of the previous tendency as well as the current tendency.

(2) In the example embodiment described above, the terminal 20 may be configured to, along with download of the video of the advertisement, download a still image related to the advertisement as well.

The download processing and drawing processing of a still image performed by the terminal 20 will be described with reference to the flowchart illustrated in FIG. 8. The processing illustrated in FIG. 8 may be, for example, executed in Operations S406 to S408 of FIG. 4, and is herein described as the processing from a state in which reproduction of the advertisement video is started.

Figure 8:
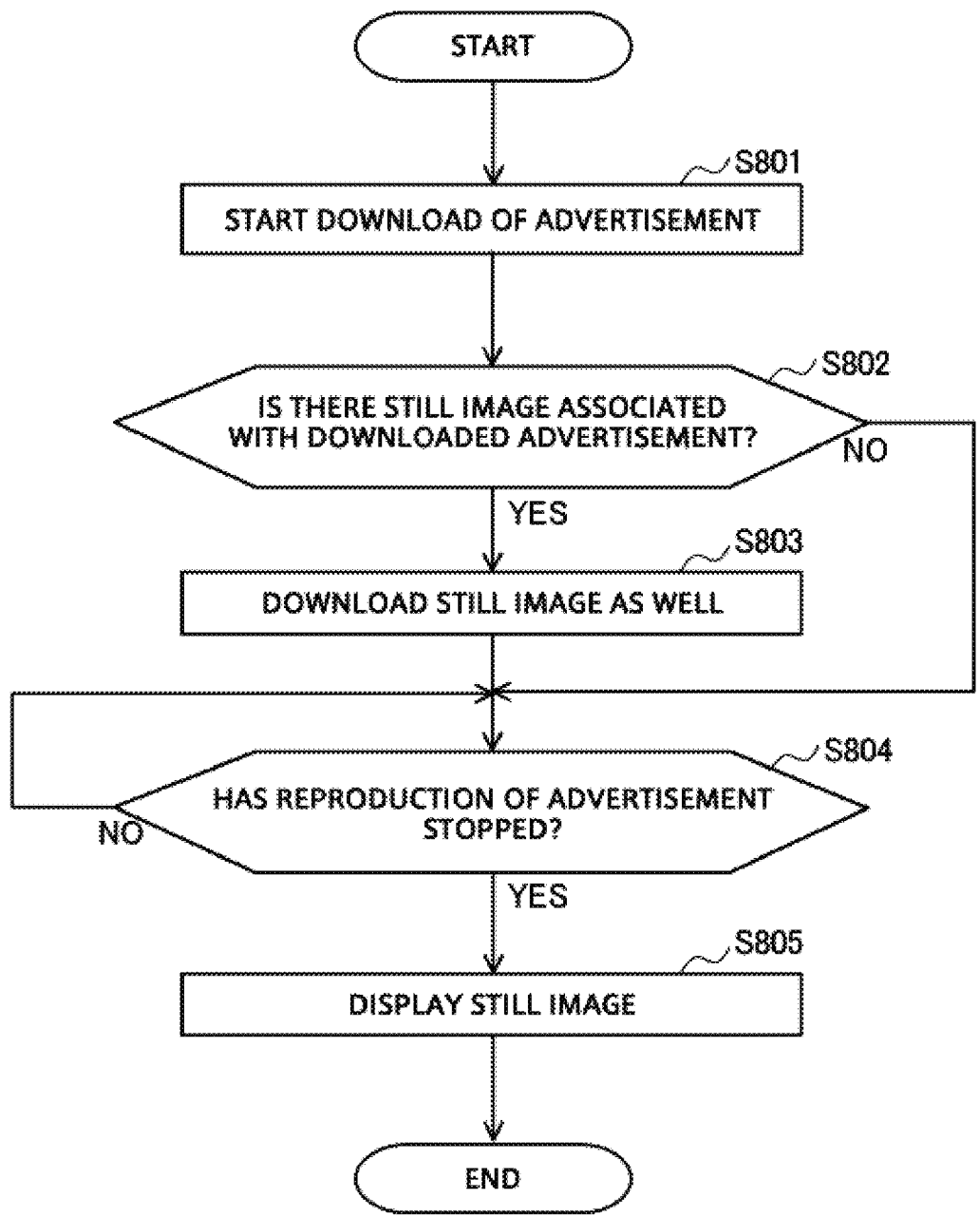
FIG. 8 is a flowchart illustrating operation related to download processing of a still image related to an advertisement in the terminal.

As illustrated in FIG. 8, the advertisement processing unit 211 downloads data of a succeeding part (without limitation, an example of the second video data) that is subsequent to the reproduced advertisement (e.g., a succeeding part of the advertisement being reproduced) (without limitation, an example of the first video data) from the advertisement server 40 (Operation S801). In this case, the advertisement processing unit 211 makes an inquiry to the advertisement server 40 as to whether there is a still image corresponding to the downloaded advertisement (Operation S802).

When there is a still image corresponding to the downloaded advertisement (YES in Operation S802), the advertisement processing unit 211 downloads the corresponding still image as well as the video (for example, without limitation, the second video data) of the advertisement (Operation S803). In some example embodiments, the timing of receiving the still image data may change based on the video data of the advertisement. When there is no still image corresponding to the downloaded advertisement (NO in Operation S802), the processing proceeds to the processing of Operation S804.

The advertisement processing unit 211 determines whether the reproduction of the video has been stopped (Operation S804). The stop of the reproduction of the video may be performed in response to an input from the user, and/or may be performed by the advertisement application when the display region in which the video is reproduced moves out of the display screen of the display unit 24 due to scroll. When the reproduction of the video is stopped (e.g., when the second video data of the advertisement is not completely downloaded while the first display based on the first video data of the advertisement is provided in the display region of the terminal), the display unit 24 of the terminal 20 displays the downloaded still image in, for example, the display region in which the advertisement video has been displayed (Operation S805). Until the reproduction of the advertisement stops (NO in Operation S804), the advertisement processing unit 211 waits regarding the present processing.

The still image used herein may be a still image related to the advertisement, and may be, for example, a logo of a company that distributes the advertisement, a logo of goods or the like related to the advertisement, an image including a link to a website of a company that distributes the advertisement, or the like. In some example embodiments, when the reproduction of the advertisement is stopped halfway, the still image may include information indicating that the reproduction (e.g., reproduction of the first video data) is being stopped, or when the download of the video of the advertisement is not completed, the still image may include information indicating the detail (for example, indicating that the advertisement is being downloaded).

The still image may be stored in the storage 28 of the terminal 20 in advance, may be downloaded together when a preceding part (without limitation, an example of the first video data) of the video is downloaded, or as described in the flowchart of FIG. 8 described above, may be downloaded before or in the middle of the download of the succeeding part of the video when a succeeding part (without limitation, an example of the second video data) of the video is downloaded. In some example embodiments, the download of the still image may be performed when the reproduction of the succeeding part of the video has completed. For the still image, one frame in the video of the advertisement may be used. Thus, in some example embodiments, image data included in the first video data may be displayed in the display region as a still image, when the second video data is not completely received (e.g., downloaded) while the first display based on the first video data is displayed in the display region of the terminal.

Further, as illustrated in Operation S805 of FIG. 8 described above, as an example, the still image can be displayed in a corresponding display region before reproduction of the video of the advertisement, or can be displayed in the display region when reproduction of the advertisement is suspended, or can be displayed at the end of the reproduction of the advertisement. As an example of the still image, the advertisement and a logo of a company may be used so that the goods and the company related to the advertisement can be impressed to the user. When the still image includes information indicating that reproduction is being stopped and includes information indicating that the download of the video is being performed, by performing display in a state in which video reproduction is suspended, the user can be informed of the state of the reproduction of the video of the advertisement. When the still image includes a link to a website of a company or the like related to the advertisement, further detailed information can be provided for the user.

(3) In the example embodiment described above, the advertisement server 40 may store, regarding one advertisement video or a plurality of videos having different data volumes of the advertisement video by changing its image quality. Here, different videos with image quality being changed refer to videos that are different in frame rate or image resolution, although the contents of the videos per se are the same.

Further, out of the advertisement videos having different image qualities, the terminal 20 may download an advertisement video that is appropriate for the terminal 20 according to a communication speed and a communication band between the terminal 20 and the advertisement server 40. In other words, when the communication speed is high or the communication band is wide, even if the advertisement video has a large data volume, it may be assumed that the download can be performed promptly and can be completed before the reproduction of the advertisement. Thus, the advertisement video that has high quality (high image quality or a high frame rate) may be downloaded. In contrast, when the communication speed is low or the communication band is narrow, it is more likely that the download cannot be completed before reproduction if the data volume of the advertisement video is large. In such a case, the advertisement video that has low quality (low image quality or a low frame rate) may be downloaded.

As an implementation example of the present processing, an example of a case implemented by the terminal 20 will be described with reference to the flowchart illustrated in FIG. 9. The processing illustrated in FIG. 9 is processing from the time when the display of the advertisement video is started in the display unit 24 of the terminal 20.

Figure 9:
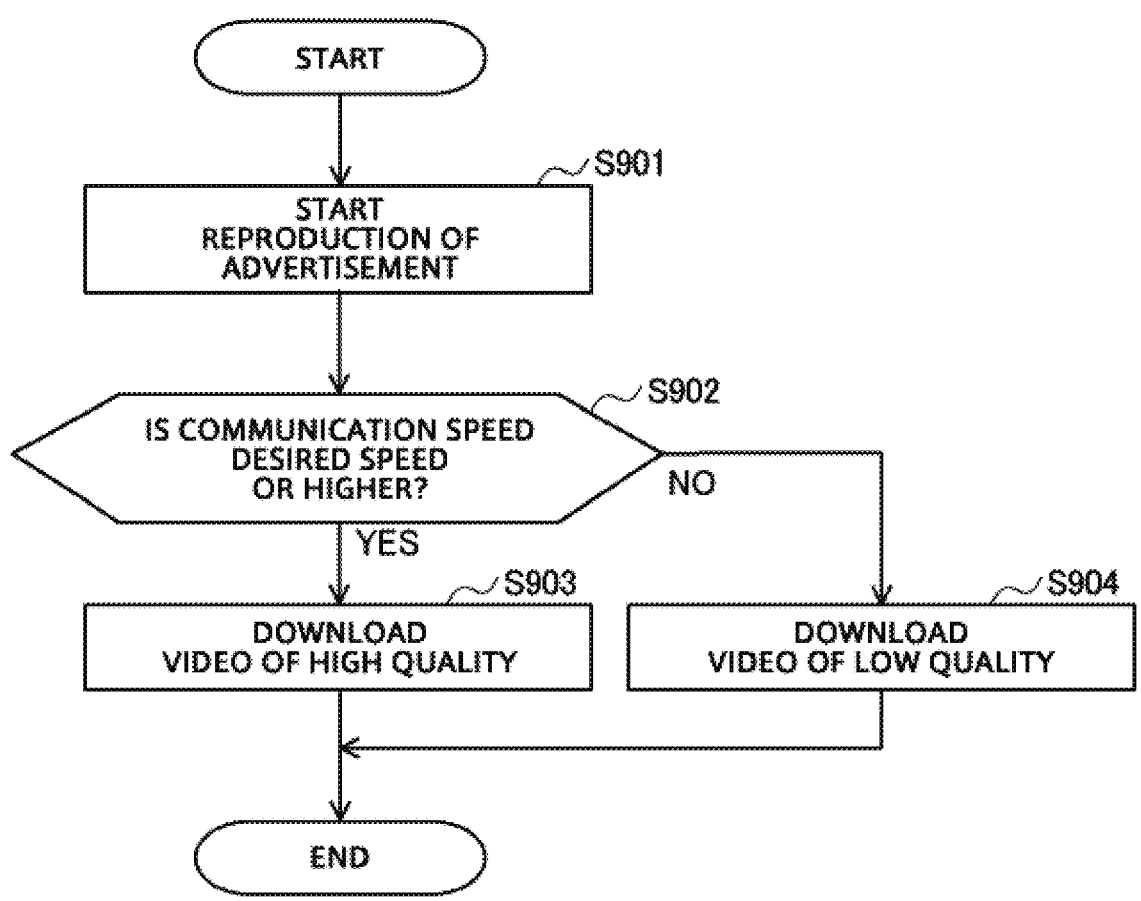
FIG. 9 is a flowchart illustrating operation related to download processing of an advertisement of quality according to a communication speed in the terminal.

As illustrated in FIG. 9, the display unit 24 of the terminal 20 starts reproduction of the advertisement (without limitation, for example, the first video data) (Operation S901). The reproduction may be based on a reproduction command input from the user, or may not be based on the reproduction command input. When the display region of the advertisement is displayed in the display unit 24, the reproduction may be automatically started.

The advertisement processing unit 211 of the terminal measures the communication speed in communication to be executed with the advertisement server 40, and determines whether the speed is a desired (or alternatively, predetermined) speed or higher (Operation S902). The measurement of the communication speed can be, for example, implemented by measuring the data volume downloaded in a desired (or alternatively, predetermined) time.

When the advertisement processing unit 211 determines that the communication speed is the desired (or alternatively, predetermined) speed or higher (YES in Operation S902), the advertisement processing unit 211 requests the advertisement server 40 to provide video data (without limitation, an example of the second video data) of high quality, which is video data (to be described later) that corresponds to a reproduced video (without limitation, an example of the first video data), and executes download (Operation S903).

On the other hand, when the advertisement processing unit 211 determines that the communication speed is not the desired (or alternatively, predetermined) speed or higher (less than the desired (or alternatively, predetermined) speed) (NO in Operation S902), the advertisement processing unit 211 requests the advertisement server 40 to provide video data of low quality (without limitation, an example of the second video data), which is (succeeding) video data that corresponds to the reproduced video (without limitation, an example of the first video data), and executes download (Operation S904). In this manner, in the communication system 1, advertisement videos having different qualities may be able to be downloaded depending on the communication speed.

Note that the description herein illustrates an example in which two levels are provided as the qualities of the video. Regarding this, however, qualities of three or more levels may be provided, and in that case, the terminal 20 may perform determination based on to which band the communication speed belongs. For example, the determination may be performed in such a manner that the video of low quality is used when the communication speed is in the first speed band (without limitation, for example, 1 to 200 Mbps), the video of intermediate quality is used when the communication speed is in the second speed band (without limitation, for example, 201 to 400 Mbps), and the video of high quality is used when the communication speed is in the third speed band (without limitation, for example, 401 to 600 Mbps).

The description herein illustrates an example in which the terminal 20 determines which video is to be downloaded based on the communication speed between the terminal 20 and the advertisement server 40. Such determination, however, may be determined on the advertisement server 40 side. When the advertisement server 40 side performs the determination, the advertisement server 40 may be configured to, when the advertisement server 40 receives the request of download (without limitation, an example of the second video data) of the advertisement from the terminal 20, identify the communication speed with the terminal 20 at the time of the reception to determine the quality of the video to be transmitted as illustrated in FIG. 9 and perform transmission of the determined video.

(4) In the example embodiment described above, regarding a certain advertisement, the advertisement server 40 may store a plurality of types of the second video data as the succeeding part (without limitation, an example of the second video data) for the preceding part (without limitation, an example of the first video data) of the advertisement. Further, the terminal 20 may be configured to select, download, and display an appropriate type of the second video data out of the plurality of types of the second video data according to a communication state with the advertisement server 40. As the plurality of types of the second video data, the plurality of types of the second video data may be pieces of data having lengths of reproduction time thereof different from each other (having different data volumes), the details (e.g., contents of the plurality of types of the second video data) may be different from each other, or the plurality of types of the second video data may be pieces of data having image qualities different from each other. When at least one of the configurations described above is applied, the terminal 20 can download video data of the advertisement that can be reproduced according to a state of the terminal 20 at the time.

(5) In the example embodiment described above, the management server 10 (determination unit 111) determines the volume of the first video data that should be downloaded by the terminal 20, but this is not restrictive. The control unit 21 may be configured to determine the volume according to communication performance of the terminal 20, or the user of the terminal 20 may perform the setting. When at least one of the configurations described above is applied, the processing load of the management server 10 is reduced, and with the management server 10 not performing the processing of determining the volume, the file position information can be received earlier. Thus, the terminal 20 can advance the download start timing of the video of the advertisement.

(6) In the example embodiment described above, the preceding part (without limitation, an example of the first video data) of the video data of the advertisement may be configured to be downloaded from the advertisement server 40 while the advertisement application is active. When the preceding part is configured to be downloaded from the advertisement server 40, the contents are displayed by the advertisement application, and when the display region of the advertisement video is displayed, the video of the advertisement can be immediately reproduced.

(7) The example embodiment described above illustrates an example in which the advertisement processing unit 211 downloads the video, which is the video of the advertisement divided into two parts, specifically the preceding part and the succeeding part. However, such a method of downloading the video by dividing the video of the advertisement is not limited to downloading of the video by dividing the video into two parts. The video of the advertisement may be downloaded by being divided into three or more parts. Further, each of the divided parts of the video need not be downloaded in the order of reproduction, except for the initial part. For example, without limitation, when the video is divided into four parts, specifically, from the initial part, the first partial data, the second partial data, the third partial data, and the fourth partial data, the video may be downloaded in the order of the third partial data, the second partial data, and the fourth partial data after the first partial data is downloaded. Alternatively, the third partial data may be downloaded together with the first partial data, and when the advertisement is reproduced, the video being divided into the second partial data and the fourth partial data may be downloaded.

To give description using other expression, it is assumed that a certain advertisement consists of frames of 1 to 100. In this case, for example, without limitation, the advertisement processing unit 211 may download the frames 1 to 30 and the frame 51 (without limitation, an example of the first video data) as the preceding part, and download the frames of 31 to 50 and the frames of 52 to 100 (without limitation, an example of the second video data) as the succeeding part. Thus, by adopting the configuration as described above, in the advertisement video, a part (e.g., frame 51) of the video that is relatively important for the advertiser can be downloaded in advance and prepared to be reproduced even if the part is not included in the first part (e.g., frames 1 to 30) of the entire video, and information important for the advertiser can be delivered to the user.

Regarding a certain advertisement, when the advertisement is downloaded in the manner of being downloaded by dividing the advertisement into a plurality of parts (the frame unit may be used), the advertisement need not be downloaded in the order of reproduction on the condition that there is no hindrance to the reproduction of the advertisement. As a matter of course, it is needless to say that the advertisement may be downloaded in the order of reproduction.

(8) In the example embodiment described above, the advertisement processing unit 211 may be configured to download partial data of a plurality of different videos (without limitation, an example of the second video data and the third video data). At least one of the second video data (e.g., a succeeding part of the advertisement succeeding the first video data) or third video data being a part of another advertisement that is different from the advertisement and succeeding the second video data) may be received based on a condition. For example, while the first advertisement is reproduced, a video (without limitation, an example of the second video data) being a succeeding part thereof and data (without limitation, an example of the third video data) of a succeeding part of the second advertisement being different from the first advertisement may be downloaded based on a condition. In some example embodiments, one of the second video data or the third video data may be received based on a condition. In some example embodiments, the second video data and the third video data may be received with different reception speeds, based on a condition. Here, the second advertisement may be another advertisement having high probability of being reproduced subsequently to the first advertisement, and in this case, the terminal 20 can promptly execute reproduction of the succeeding video advertisement.

The advertisement processing unit 211 may constantly perform such download, or may perform such download under a desired (or alternatively, predetermined) condition. Here, for example, without limitation, the desired (or alternatively, predetermined) condition may be a condition in which the remaining seconds of the reproduction of the reproduced video are short (the remaining seconds are desired (or alternatively, predetermined) seconds or less), for example. For example, without limitation, the desired (or alternatively, predetermined) condition may be based on a history relating to viewing of the advertisements in the terminal 20. For example, the terminal 20 with high viewing frequency of the advertisements may be configured to download a larger number of a plurality of different pieces of advertisement data, as compared to the terminal 20 with low viewing frequency of the advertisements. For example, without limitation, the desired (or alternatively, predetermined) condition may be a condition relating to the start of the reproduction of the data (without limitation, an example of the second video data) of the succeeding part of the first advertisement. In such a case, only a succeeding part (without limitation, an example of the second video data) of the reproduced video may be received, and when the data (without limitation, an example of the third video data) of the second advertisement is received together with the data (without limitation, an example of the second video data) of the succeeding part of the first advertisement, data whose reception speed of the data of the succeeding part of the first advertisement is higher than the reception speed of the data of the second advertisement may be received. In some example embodiments, the desired (or alternatively, predetermined) condition may be a condition relating to stop of reproduction in the display region of the second display based on the second video data. In such case, only the third video data or the third video data with the reception speed higher than the second video data may be received based on the condition. Here, for example, without limitation, "the reception speed of the data of the succeeding part of the first advertisement is higher than the reception speed of the data of the second advertisement" means that the time to finish downloading the data of the succeeding part of the first advertisement is shorter than the time to finish downloading the data of the second advertisement. In some example embodiments, such condition may relate to a display mode of the second video data or the third video data while the application is active.

When a plurality of different advertisements are downloaded as described above, pieces of data (without limitation, an example of the second video data and the third video data) of advertisements with different reception speeds (the times required by the terminal 20 to complete the download are different) may be received. When pieces of advertisement data with different reception speeds are received, the data (without limitation, an example of the third video data) of the video related to the second advertisement, which is different from the first advertisement, with the higher reception speed, may be configured to be received rather than the data (without limitation, an example of the second video data) of the video related to the first advertisement. When the reception speed of the data of the second advertisement is higher than the data of the first advertisement, influence on the download of the data of the first advertisement can be reduced. The download of the data related to the second advertisement may be a still image instead of the video. In some example embodiments, as the data related to the first advertisement, the still image may be configured to be downloaded, and as the data related to the second advertisement, the video may be configured to be downloaded.

Note that the modification according to the download illustrated in modification (8) may be executed between Operations S404 and S408 of FIG. 4.

Figure 10:
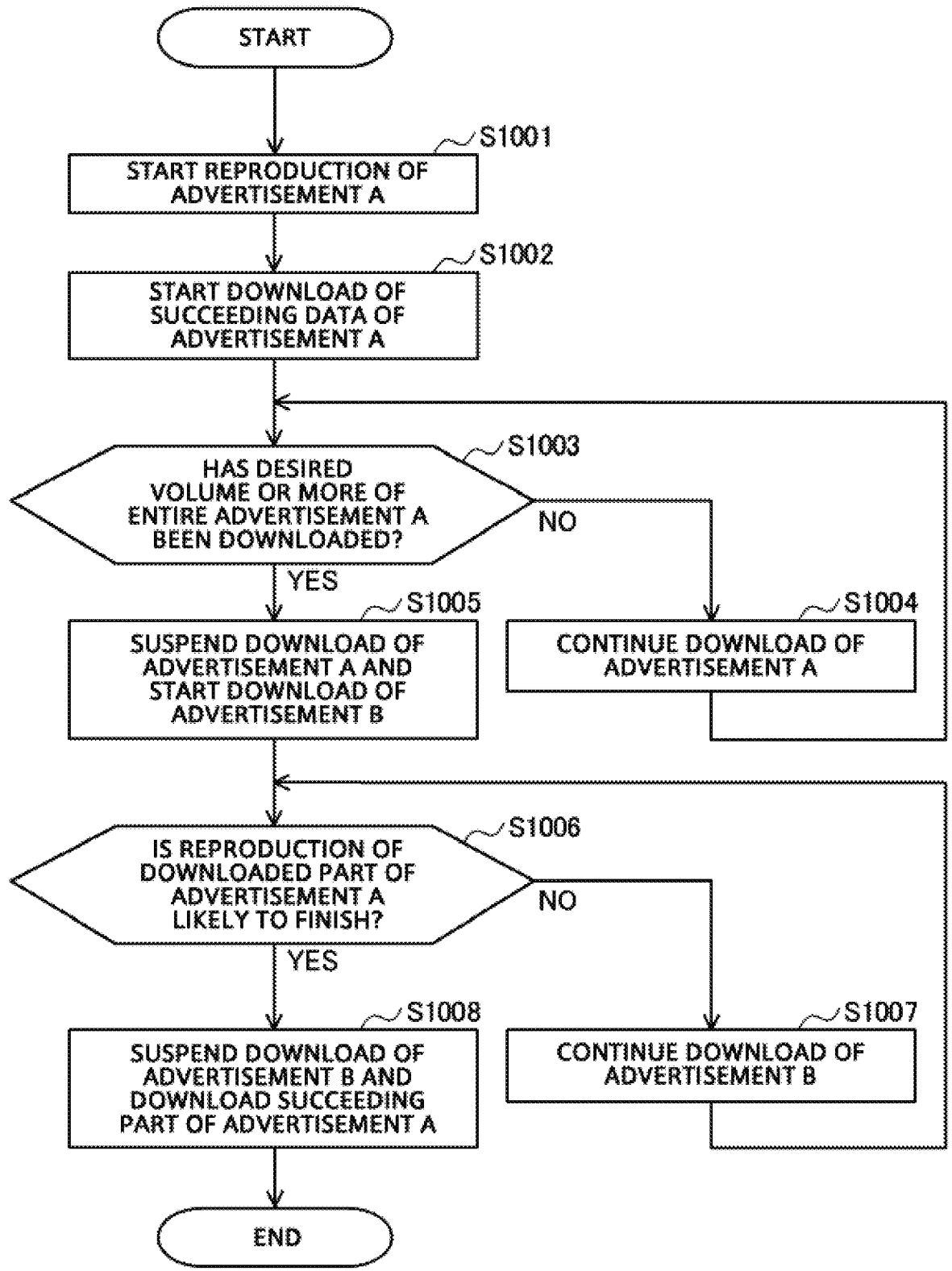
FIG. 10 is a flowchart illustrating operation related to an example of download processing of an advertisement in the terminal.

(9) Here, one aspect of the download of the advertisement that may be performed by the advertisement processing unit 211 will be described. In the present modification, when the advertisement processing unit 211 downloads a certain advertisement and a certain amount (an amount that is estimated not to hinder the reproduction of the advertisement) of data has been accumulated while the succeeding part (without limitation, an example of the second video data) of the advertisement is downloaded simultaneously with display (reproduction) of the advertisement, the advertisement processing unit 211 downloads data of another advertisement. FIG. 10 is a flowchart illustrating the flow of the processing thereof. The processing illustrated in FIG. 10 is processing performed between Operations S407 and S408 in the processing illustrated in FIG. 4.

As illustrated in FIG. 10, the advertisement processing unit 211 causes the display processing unit 212 to execute the display of the advertisement displayed in the display unit 24 (Operation S1001). Note that the processing of Operation S1001 is in common to the processing of Operation S407. Here, it is assumed that the advertisement to be reproduced is an advertisement A.

Regarding the advertisement A, while giving a command of reproduction of the preceding part (without limitation, an example of the first video data) to the display processing unit 212, the advertisement processing unit 211 starts download of the data (without limitation, an example of the second video data) of the succeeding part being the succeeding part of the advertisement A (Operation S1002).

The advertisement processing unit 211 determines whether a desired (or alternatively, predetermined) volume or more of the entire advertisement A has been downloaded. In other words, the advertisement processing unit 211 determines whether a desired (or alternatively, predetermined) volume or more of the data of the succeeding part of the advertisement A has been successfully downloaded (Operation S1003). Here, the desired (or alternatively, predetermined) volume or more may be set for each advertisement, or may be set in common for a plurality of advertisements. The desired (or alternatively, predetermined) volume or more may be represented in the number of bytes of the downloaded data, and when the download is performed with the succeeding part of the advertisement A being divided into a plurality of pieces of partial data, the desired (or alternatively, predetermined) volume or more may be represented in the number of the pieces of partial data, or may be represented in a certain ratio or more with respect to the entire volume of the advertisement A (or the volume of the data downloaded as the succeeding part of the advertisement A).

When the desired (or alternatively, predetermined) volume or more of the advertisement A has not been successfully downloaded (NO in Operation S1003), the advertisement processing unit 211 continues the download of the advertisement A (Operation S1004). On the other hand, when the desired (or alternatively, predetermined) volume or more of the advertisement A has been successfully downloaded (YES in Operation S1003), the advertisement processing unit 211 suspends the download of the advertisement A. Then, the advertisement processing unit 211 starts download of another advertisement (here, referred to as an advertisement B) that is different from the advertisement A. Here, the advertisement B may be any advertisement as long as the advertisement is different from the advertisement A and is an un-downloaded advertisement. For example, without limitation, with the advertisement selected according to the criteria illustrated in FIG. 5 being defined as the advertisement B, the download of the video data of the advertisement B is started (Operation S1005). Here, the video data of the advertisement B to be downloaded may be the preceding part or may be the succeeding part.

The advertisement processing unit 211 determines whether the reproduction of the downloaded part of the reproduced advertisement A is likely to finish (Operation S1006). Here, for example, without limitation, the determination as to whether the reproduction of the downloaded part of the advertisement A is likely to finish may be determined by whether a certain ratio or more (for example, 80 percent or more) of the volume of the reproduced data with respect to the data volume of the downloaded advertisement A has been reproduced. In some example embodiments, it may be determined that the reproduction is likely to finish, based on that the data volume that has not been reproduced falls below a desired (or alternatively, predetermined) threshold.

When the reproduction of the downloaded part of the advertisement A is likely to finish (YES in Operation S1006), the advertisement processing unit 211 suspends the download of the advertisement B, and downloads the succeeding part of the advertisement A, that is, an un-downloaded part of the data of the advertisement A (Operation S1008), and terminates the processing. When the reproduction of the downloaded part of the advertisement A is not likely to finish (NO in Operation S1006), the advertisement processing unit 211 continues the download of the advertisement B (Operation S1007). In this case, the advertisement processing unit 211 performs the determination as illustrated in Operation S1003 for the advertisement B as well, and if the download of a certain amount of data of the advertisement B has been completed, the advertisement processing unit 211 may be configured to download data of a further different advertisement C.

In this manner, the advertisement processing unit 211 may be configured to download data of a different advertisement on a condition that the advertisement processing unit 211 has downloaded a certain amount or more of data of a certain advertisement during reproduction thereof while the certain advertisement is being reproduced and in a state in which the advertisement processing unit 211 has not downloaded all of the data yet. In a case of the advertisement that needs long time for its reproduction, it is predicted that there is a low probability that the advertisement is viewed until the end. Thus, by performing download of another advertisement when a certain amount or more of the data of the advertisement has been successfully downloaded, when the user stops the reproduced advertisement halfway and continues to reproduce a succeeding advertisement, reproduction of the succeeding advertisement can be performed without delay.

Additional Notes

Description has been provided based on the drawings and some example embodiments of the present disclosure. It should be noted that a person skilled in the art could easily make various modifications and corrections based on the present disclosure. Thus, it should be noted that such modifications and corrections are encompassed within the scope of the present disclosure. For example, without limitation, the functions or the like included in each means, each operation, or the like could be rearranged as long as the functions are not logically incoherent, and a plurality of means, operations, or the like may be configured to be combined into one or may be configured to be divided, or a part thereof may be configured not to be executed. The configurations illustrated in the example embodiments may be combined as appropriate.

What is claimed is:

1. An advertisement display method of displaying an advertisement transmitted from a server in a terminal of a user, the advertisement display method comprising:
   receiving, by the terminal of the user from the server, first video data being a part of video data of the advertisement;
   controlling, by a processor of the terminal, to activate an application in response to selection of the application by the user;
   displaying a first display based on the first video data in a display region of the terminal while the application is active;
   receiving, from the server, second video data which is different from the first video data included in the video data of the advertisement, based on reception of the first video data; and
   displaying a second display based on the second video data in the display region, in association with the first display in the display region, wherein
   the receiving the first video data includes receiving the first video data of the advertisement from the server, in response to a reproduction count of the advertisement reproduced in the terminal being a first reproduction count, and
   the receiving the first video data includes receiving the first video data and third video data being a part of another advertisement, which is different from the advertisement, from the server in response to the reproduction count of the advertisement reproduced in the terminal being a second reproduction count greater than the first reproduction count,
   wherein the receiving of the second video data is suspended and the receiving of the third video data is started, in response to a threshold volume of the advertisement having been received.

2. The advertisement display method according to claim 1, wherein the receiving the first video data includes receiving the first video data of a data volume, which is determined based on information relating to the user, from the server.

3. The advertisement display method according to claim 2, wherein the information relates to a communication speed of the terminal of the user.

4. The advertisement display method according to claim 3, wherein the information relates to a communication history of the terminal of the user.

5. The advertisement display method according to claim 1, further comprising:
   receiving video data of a part of each of one or more advertisements from the server, the one or more advertisements being different from the advertisement, and
   controlling, by the processor, to change a number of the one or more advertisements received from the server based on information relating to reproduction of the advertisement on the terminal.

6. The advertisement display method according to claim 1, further comprising:
receiving video data of a part of each of one or more advertisements from the server, the one or more advertisements being different from the advertisement,
controlling, by the processor, to change a number of the one or more advertisements received from the server based on a purchase history of goods advertised in the terminal of the user.

7. The advertisement display method according to claim 1, wherein
the receiving the first video data includes receiving the first video data of the advertisement from the server, in response to a purchase history of goods advertised in the terminal being a first purchase history, and
the receiving the first video data includes receiving the first video data and third video data being a part of another advertisement, which is different from the advertisement, from the server, in response to the purchase history being a second purchase history in which more goods are purchased by the terminal than the first purchase history.

8. The advertisement display method according to claim 1, further comprising:
receiving a still image data based on the first video data.

9. The advertisement display method according to claim 8, further comprising:
displaying third display based on the still image data in the display region in response to the second video data being not completely downloaded while the first display based on the first video data is displayed in the display region of the terminal.

10. The advertisement display method according to claim 8, wherein the still image data includes information related to a logo of the advertisement.

11. The advertisement display method according to claim 8, further comprising:
controlling, by the processor, to change a timing of receiving the still image data based on the video data of the advertisement.

12. The advertisement display method according to claim 11, further comprising:
receiving the still image data while the second video data is received or after the second video data is received, in response to the terminal displaying a third display based on the still image data after reproducing the video data of the advertisement.

13. The advertisement display method according to claim 8, wherein the still image data based on the first video data includes information indicating that reproduction of the first video data is stopped.

14. The advertisement display method according to claim 1, further comprising:
displaying image data included in the first video data in the display region as a still image in response to the second video data being not completely received while the first display based on the first video data is displayed in the display region of the terminal.

15. The advertisement display method according to claim 1, further comprising:
controlling, by the processor, to change a data volume of the second video data to be received based on information relating to a communication speed of the terminal of the user.

16. The advertisement display method according to claim 1, further comprising:
receiving at least one of the second video data or third video data based on a condition, the third video data being a part of another advertisement that is different from the advertisement.

17. The advertisement display method according to claim 16, wherein
one of the second video data and the third video data is received based on the condition, or
the second video data and the third video data are received with different reception speeds, based on the condition.

18. The advertisement display method according to claim 17, wherein
the condition relates to stop of reproduction of the second display based on the second video data in the display region, and
only the third video data or the third video data with a reception speed higher than the second video data is received based on the condition.

19. The advertisement display method according to claim 16, wherein the condition relates to a history relating to viewing of the advertisement of the terminal.

20. The advertisement display method according to claim 16, wherein
the condition relates to start of the second display based on the second video data in the display region, and
only the second video data or the second video data with a reception speed higher than the third video data is received based on the condition.

21. The advertisement display method according to claim 16, wherein the condition relates to a display mode of the second video data or the third video data while the application is active.

22. The advertisement display method according to claim 1, further comprising:
transmitting information relating to a data volume of the first video data to the server.

23. The advertisement display method according to claim 1, wherein the receiving the first video data includes receiving the first video data from the server while the application is active.

24. A non-transitory computer readable medium storing an advertisement display program that, when executed by a processor, causes a terminal of a user including the processor to perform an advertisement display method of displaying an advertisement transmitted from a server, the method comprising:
receiving, by the terminal of the user from the server, first video data being a part of video data of the advertisement;
controlling to activate an application in response to selection of the application by the user;
displaying a first display based on the first video data in a display region of the terminal while the application is active;
receiving, from the server, second video data being different from the first video data included in the video data of the advertisement, based on reception of the first video data; and
displaying a second display based on the second video data in the display region, in association with the first display in the display region, wherein
the receiving the first video data includes receiving the first video data of the advertisement from the server, in response to a reproduction count of the advertisement reproduced in the terminal being a first reproduction count, and the receiving the first video data includes receiving the first video data and third video data being a part of another advertisement, which is different from the advertisement, from the server in response to the reproduction count of the advertisement reproduced in the terminal being a second reproduction count greater than the first reproduction count, wherein the receiving of the second video data is suspended and the receiving of the third video data is started, in response to a threshold volume of the advertisement having been received.

25. A terminal of a user that displays an advertisement transmitted from a server, the terminal comprising:

a memory configured to a program; and one or more processors configured to execute the program such that the one or more processors are configured to cause the terminal of the user to, receive, by the terminal of the user from the server, first video data being a part of video data of the advertisement, control to activate an application in response to selection of the application by the user, display a first display associated with the first video data in a display region of the terminal while the application is active, receive, from the server, second video data being different from the first video data included in the video data of the advertisement, based on reception of the first video data, and display a second display associated with the second video data in the display region, based on the first display in the display region, wherein the one or more processors are configured to cause the terminal of the user to receive the first video data by receiving the first video data of the advertisement from the server, in response to a reproduction count of the advertisement reproduced in the terminal being a first reproduction count, and receiving the first video data and third video data being a part of another advertisement, which is different from the advertisement, from the server in response to the reproduction count of the advertisement reproduced in the terminal being a second reproduction count greater than the first reproduction counts, and wherein the one or more processors are configured to cause the terminal of the user to suspend the receiving of the second video data and start the receiving of the third video data, in response to a threshold volume of the advertisement having been received.

* * * * *